United States Patent
Saito et al.

(10) Patent No.: US 8,833,918 B2
(45) Date of Patent: *Sep. 16, 2014

(54) INK COMPOSITION, INK SET, AND IMAGE FORMING METHOD

(71) Applicant: Fujifilm Corporation, Tokyo (JP)

(72) Inventors: Ryo Saito, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,012

(22) Filed: Jul. 31, 2013

(65) Prior Publication Data

US 2013/0307899 A1  Nov. 21, 2013

Related U.S. Application Data

(63) Continuation of application No. PCT/JP2011/073858, filed on Oct. 17, 2011.

(30) Foreign Application Priority Data

Feb. 17, 2011 (JP) .................................. 2011-032562

(51) Int. Cl.
| | | |
|---|---|---|
| B41J 2/01 | (2006.01) | |
| C09D 11/38 | (2014.01) | |
| B41M 5/00 | (2006.01) | |
| C09D 11/00 | (2014.01) | |
| C09D 7/12 | (2006.01) | |
| C09D 11/322 | (2014.01) | |
| C09D 11/40 | (2014.01) | |
| C09D 11/54 | (2014.01) | |
| C09C 1/56 | (2006.01) | |
| B41M 7/00 | (2006.01) | |
| B41J 2/21 | (2006.01) | |
| C09C 3/10 | (2006.01) | |

(52) U.S. Cl.
CPC .............. *C09D 11/38* (2013.01); *B41J 2/2107* (2013.01); *B41J 2/01* (2013.01); *B41M 5/00* (2013.01); *C09D 11/00* (2013.01); *C09C 3/10* (2013.01); *C09D 7/1225* (2013.01); *C09D 11/322* (2013.01); *C09D 11/40* (2013.01); *C09D 11/54* (2013.01); *C09C 1/56* (2013.01); *C09C 1/565* (2013.01); *C01P 2004/51* (2013.01); *B41M 7/009* (2013.01)
USPC .............. 347/100; 347/102; 347/96; 347/101

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101

USPC ......... 347/100, 95, 96, 101, 102, 88, 99, 103, 347/105; 106/31.13, 31.27, 31.6; 523/160, 523/161

See application file for complete search history.

(56) References Cited

U.S. PATENT DOCUMENTS

| | | | |
|---|---|---|---|
| 2004/0011247 A1* | 1/2004 | Taguchi | 347/100 |
| 2006/0098067 A1* | 5/2006 | Imai et al. | 347/100 |
| 2006/0103704 A1* | 5/2006 | Hakamada et al. | 347/100 |
| 2007/0247492 A1* | 10/2007 | Mori | 347/45 |
| 2009/0115818 A1 | 5/2009 | Matsuo et al. | |
| 2009/0115823 A1 | 5/2009 | Matsuo et al. | |
| 2010/0041816 A1* | 2/2010 | Ikoshi et al. | 106/31.6 |
| 2010/0166962 A1 | 7/2010 | Ohzeki | |
| 2010/0222498 A1 | 9/2010 | Yatake et al. | |
| 2011/0193912 A1* | 8/2011 | Sakai et al. | 347/20 |

FOREIGN PATENT DOCUMENTS

| | | |
|---|---|---|
| CN | 101428501 A | 5/2009 |
| JP | H04-356570 A | 12/1992 |
| JP | H08-113740 A | 5/1996 |
| JP | 3000853 B2 | 1/2000 |
| JP | 2007-169314 A | 7/2007 |
| JP | 2010-065205 A | 3/2010 |
| JP | 2010-155359 A | 7/2010 |
| WO | 20091063996 A | 5/2009 |

OTHER PUBLICATIONS

Written Opinion of the ISA issued in International Application No. PCT/JP2011/073858 mailed on Jan. 24, 2012.
International Search Report issued in International Application No. PCT/JP2011/073858 mailed on Jan. 24, 2012.
Partial English language translation of the following: Office action dated May 21, 2014 from the Chinese Patent Office in a Chinese patent application corresponding to the instant patent application. This office action translation is submitted now in order to supplement the understanding of patent document CN101428501A which is cited in the office action and are being disclosed in the instant Information Disclosure Statement.

\* cited by examiner

*Primary Examiner* — Manish S Shah
(74) *Attorney, Agent, or Firm* — SOLARIS Intellectual Property Group, PLLC

(57) ABSTRACT

An ink jet composition which contains a pigment selected from the group consisting of a self-dispersing pigment and a resin-coated pigment in which at least a portion of a surface of a pigment particle is coated with a water-insoluble resin; at least one selected from the group consisting of polyvinylpyrrolidone, polyvinyl alcohol and polyethylene glycol, the content of which is from 0.01% by mass to less than 1.00% by mass based on the total mass of the composition; a resin particle that is insoluble or hardly soluble in water; a wax particle that is insoluble or hardly soluble in water; and water.

13 Claims, No Drawings

INK COMPOSITION, INK SET, AND IMAGE FORMING METHOD

CROSS-REFERENCE TO RELATED APPLICATIONS

This application is a continuation application of International Application No. PCT/JP/2011/073858, filed Oct. 17, 2011, which is incorporated herein by reference. Further, this application claims priority from Japanese Patent Application No. 2011-032562, filed Feb. 17, 2011, which is incorporated herein by reference.

TECHNICAL FIELD

The present invention relates to an ink composition, an ink set, and an image forming method.

BACKGROUND ART

In a recording method that uses an ink jet method, ink is jetted in the form of liquid droplets from plural nozzles arranged in an ink jet head, whereby a high-quality image can be recorded on various types of recording media. Accordingly, the recording method is widely used.

For example, a pigment is widely used as a colorant that is one of the components contained in ink, and the pigment is used by being dispersed in medium such as water. When the pigment is used by being dispersed, the size of dispersed particles formed when the pigment is dispersed, stability after dispersion, uniformity of the size, jetting property of the pigment from an jetting head, image density, and the like are important, and techniques for improving these are examined in various ways.

A pigment ink containing a pigment is getting thickened and gradually solidified as a solvent component in the ink evaporates. After being solidified, the pigment ink is not easily dissolved again. Accordingly, the pigment ink is stuck to the tip of nozzle and the like of the ink jet head and then deposited thereon slowly. As a result, the nozzle hole is narrowed or blocked, whereby problems that the jetting direction of the ink is bent, or the ink is not jetted arise easily. If the stuck ink is easily deposited, performances produced by a nozzle cap, a wiping section, or the like are not easily maintained, and image formability deteriorates over time.

Particularly, for example, if an ink is composed to contain a macromolecular component such as a polymer or wax such that the formed image has rubbing resistance and is suppressed from being peeled, the ink is easily solidified and deposited as described above.

Regarding the above problem, a method of using a liquid that cleans the stuck ink is proposed. For example, there is a disclosure regarding a maintenance liquid for ink jet recording that contains a resin solvent which is insoluble or hardly-soluble in water and a moisturizer (see Japanese Patent Application Laid-Open (JP-A) No. 2007-169314, for example). According to the disclosure, if such a maintenance liquid is used, problems such as unstable jetting or nozzle blocking are not easily caused.

Meanwhile, for the ink that uses a pigment, a dispersant is used for dispersing the pigment in general, and a polyvinylpyrrolidone is known as the dispersant. For example, there is a disclosure regarding an aqueous recording ink that contains polyvinylpyrrolidone as a polymer dispersant as well as a pigment, a resin emulsion, and the like (see JP-A No. 4-356570 and Japanese Patent No. 3000853, for example).

SUMMARY OF INVENTION

Technical Problem

However, when the ink contains polymer components such as resin particles and the like or wax, the ink is not sufficiently removed by simply providing a maintenance liquid which contains a resin solvent or a moisturizer, wiping the ink, or the like that are performed in the related art as described above, and the ink is deposited over time. As a result, the nozzle cannot be maintained in a state that can stably jet the ink.

Moreover, in the ink containing polyvinylpyrrolidone as a pigment dispersant, the pigment itself does not have dispersibility in general. In such an ink, a large amount of polyvinylpyrrolidone is consumed to provide dispersibility, and dispersibility of the ink is maintained in this manner. Particularly, when a resin or wax coexists in the composition of the ink, the liquid viscosity further increases as the amount of polyvinylpyrrolidone increases, whereby nozzle blocking tends to be more easily caused. The deposition of ink over time becomes more serious as the viscosity increases.

The present invention has been made in consideration of the above situation. The present invention provides an ink composition and an ink set that are composed to contain polymer components such as resin particles or wax particles, suppress jetting failure and bending of jetting direction of ink droplets that are caused when the ink is jetted again after suspension of jetting, and have excellent maintainability. The present invention also provides an image forming method that inhibits image failures such as color missing and stably forms high-definition images over a long period of time.

Solution to Problem

The present inventors found that if polyvinylpyrrolidone is present in a composition in which a self-dispersibility is provided to a pigment, the ink is suppressed from being solidified without consuming the polyvinylpyrrolidone as a dispersant, the stuck ink is easily removed by wiping or the like, and the ink is not easily stuck to the nozzle surface or the like. Based on this finding, the present invention has been completed.

Specific Solutions to Solve the Above Problems are as Follows

<1> An ink composition, comprising:
a pigment selected from the group consisting of a self-dispersing pigment and a resin-coated pigment in which at least a portion of a surface of a pigment particle is coated with a water-insoluble resin;
at least one selected from the group consisting of polyvinylpyrrolidone, polyvinyl alcohol and polyethylene glycol, the content of which is from 0.01% by mass to less than 1.00% by mass based on the total mass of the composition;
a resin particle that is insoluble or hardly soluble in water;
a wax particle that is insoluble or hardly soluble in water; and
water.

<2> The ink composition of <1>, wherein the resin-coated pigment is a pigment coated with the water-insoluble resin by phase inversion emulsification.

<3> The ink composition of <1> or <2>, wherein the resin particle is a self-dispersing resin particle.

<4> The ink composition according to any one of <1> to <3>, wherein the resin particle has been synthesized in an organic solvent, and prepared as a dispersion that has water as a continuous phase by neutralization of a part or all of anionic groups of the resin particle.

<5> The ink composition according to any one of <1> to <4>, wherein the wax particle contains at least one selected from the group consisting of paraffin wax, a paraffin wax derivative, carnauba wax, and any mixture thereof.

<6> The ink composition according to any one of <1> to <5>, wherein the pH of the composition is from 7.5 to 10.0 at 25° C.

<7> The ink composition according to any one of <1> to <6>, further comprising at least one selected from the group consisting of urea and a urea derivative.

<8> An ink set comprising:
the ink composition according to any one of <1> to <7>; and
an aggregation component that forms an aggregate when in contact with the ink composition.

<9> An image forming method, comprising jetting an ink composition from a jetting head to a recording medium by an ink jet method, wherein:
the ink composition is that of any one of <1> to <7> or that in the ink set of <8>; and
the jetting head has plural nozzle holes for jetting liquid droplets and a silicon atom-containing film on an internal surface of the nozzle holes.

<10> The image forming method of <9>, wherein the jetting is performed according to a piezoelectric ink jet method.

<11> The image forming method of <9> or <10>, further comprising applying, to the recording medium, a treatment liquid comprising an aggregation component which forms an aggregate when in contact with the ink composition.

<12> The image forming method of <11>, further comprising fixing an image to the recording medium by heating the image, wherein the image is formed by the applying of the ink composition and the applying of the treatment liquid.

Advantageous Effects of Invention

According to the present invention, an ink composition and an ink set that are composed to contain polymer components such as resin particles or wax particles, suppress jetting failure and bent jetting direction that are caused when the ink is jetted again after suspension of jetting, and have excellent maintainability are provided.

In addition, according to the present invention, an image forming method that inhibits image failures such as color missing and stably forms high-definition images over a long period of time is provided.

DESCRIPTION OF EMBODIMENTS

Hereinafter, the ink composition and ink set according to the invention, and the image forming method that uses these will be described in detail.
<Ink Composition and Ink Set>
The ink composition according to the invention contains at least a pigment selected from the group consisting of a self-dispersing pigment and a resin-coated pigment in which at least a portion of the surface of the pigment is coated with a water-insoluble resin; at least one selected from polyvinylpyrrolidone, polyvinyl alcohol, and polyethylene glycol, and the content of which is from 0.01% by mass to 1.00% by mass based on the total mass of the composition; a resin particle that is insoluble or hardly-soluble in water; a wax particle that is insoluble or hardly-soluble in water; and water.

The ink composition may or may not optionally further contain additives such as urea, a urea derivative, and/or a surfactant.

In an image forming method in which ink droplets are jetted to a recording medium by an ink jet method, an adherend, which is caused by the ink that is stuck to the periphery of the jetting holes (for example, nozzle holes arranged on a nozzle plate) of an jetting head at the time of jetting of the ink, is deposited easily in general. Particularly, when an aqueous ink liquid that contains a pigment as a colorant is composed to contain resin particles and wax particles that are insoluble or hardly-soluble in water, the resin particles and wax particles in the ink liquid are precipitated and deposited onto the periphery of the nozzle holes that jets the ink liquid. Accordingly, the amount of the adherend tends to further increase, and the increase in the amount of adherend (hereinafter, described as "growth of adherend") tends to be caused more rapidly, compared to a case where the ink does not contain resin particles or the like. Therefore, if images are continuously formed while the jetting of the ink liquid and suspension of the jetting are being repeated, the nozzle holes are narrowed since the adherend grows over time, and bent jetting in which the jetted ink droplets deviate from a target landing position is caused. As a result, nozzle blocking is caused, and sometimes this leads to a phenomenon in which the ink is not jetted. In the invention, self-dispersibility is provided to the pigment itself contained as a colorant in the ink composition, and the content of polyvinylpyrrolidone (hereinafter, sometimes abbreviated to PVP), polyvinyl alcohol (hereinafter, sometimes abbreviated to PVA), and/or polyethylene glycol (hereinafter, sometimes abbreviated to PEG) based on the total mass of the ink composition is set to fall within a specific range in which the content becomes relatively small. This makes deposition of the adherend of ink on the periphery of nozzle holes be hardly occur, and makes it easy to remove the stuck ink by wiping or the like. Presumably, this may be because PVP or the like is adsorbed onto the surface (for example, the plate surface of a nozzle plate) of the periphery of nozzle holes of the jetting head or onto the surface (wall surface) of the inner wall of an ink flow path in the holes, and due to the adsorption of PVP or the like, adsorption sites on the plate surface and the inner wall surface of holes onto which the resin particles or wax particles can be adsorbed are reduced.

Since the ink is configured as above, when images are formed while the jetting of ink liquid and the suspension of jetting are being repeated, the bent jetting or jetting failure of the ink is suppressed, the occurrence of image failures such as color missing is inhibited, and high-definition images are stably formed over a long period of time. Moreover, since the ink hardly adheres to the periphery of the nozzle holes, and the stuck ink does not easily grow as an adherend, excellent maintainability is obtained.

In the invention, PVP, PVA, and PEG are used within a specific range in which the amount thereof based on the entire ink composition be relatively small, and considered to have a function of inhibiting sticking of the ink rather than a function of a pigment dispersant.

(Pigment)
The ink composition of the invention contains, as a colorant, at least one kind of a self-dispersing pigment and/or a resin-coated pigment in which at least a portion of the surface of the pigment is coated with a water-insoluble resin. The pigment may be any of organic and inorganic pigments.

Examples of the organic pigments include an azo pigment, a disazo pigment, an azo lake pigment, a quinacridone pigment, a perylene pigment, an anthraquinone pigment, a polycyclic pigment, dye chelate, a nitro pigment, a nitroso pigment, aniline black, and the like. One kind of the organic pigment can be used alone, or two or more kinds thereof can be used by being mixed with each other at any ratio. Specific examples of cyan pigments include C. I. Pigment Blue 1, 2, 3, 15, 15:1, 15:2, 15:3, 15:34, 16, 17:1, 22, 25, 56, 60, C. I. Vat Blue 4, 60, 63, and the like. A (copper) phthalocyanine pigment is preferable, and C. I. Pigment Blue 15:3 is particularly preferable. Examples of magenta pigments include C. I. Pigment Red 48, 57, 122, 184, 188, C. I. Pigment Violet 19, and the like. A quinacridone pigment is preferable, and C. I. Pigment Red 122 and C. I. Pigment Violet 19 are particularly preferable.

Examples of the inorganic pigments include titanium oxide, iron oxide, calcium oxide, barium oxide, aluminum hydroxide, barium yellow, cadmium red, chromium yellow, carbon black, and the like. Among these, carbon black is particularly preferable. Examples of the carbon black include those produced by a known method such as a contact method, a furnace method, or a thermal method. Specific examples thereof include furnace black, thermal lamp black, acetylene black, channel black, and the like.

In the invention, in view of suppressing sticking of the ink caused by PVP or the like contained in the ink composition and removing the phenomenon such as jetting failure or bent jetting of ink droplets, self-dispersibility is provided to the pigment itself such that the pigment stably disperses for itself in an aqueous liquid. Specifically, a self-dispersing pigment and/or a resin-coated pigment in which at least a portion of the pigment surface is coated with a water-insoluble resin are(is) used as the pigment.

Self-Dispersing Pigment

The self-dispersing pigment is a pigment which is treated so as to have one or two or more kinds of functional groups (dispersibility-providing groups) selected from the group consisting of —COOH, —CHO, —OH, —SO$_3$H, and a salt of these on the pigment surface. This pigment can evenly disperse in an aqueous ink composition even if a dispersant is not additionally mixed. Moreover, the word "disperse" mentioned herein refers to a state where the self-dispersing pigment is stably present in water without a dispersant. The state includes not only a state where the pigment is dispersed but also a state where the pigment is dissolved.

In the ink composition in which the self-dispersing pigment mixed, the contained PVP, PVA, and/or PEG, which are described below, do not contribute to the dispersing of the pigment and act effectively to suppress jetting failure or bent jetting. In addition, the ink composition exhibits a high degree of dispersion stability and has appropriate viscosity. Consequently, the ink composition can contain a larger amount of pigment. Accordingly, a high-definition image having excellent color density can be stably formed over a long period of time.

The self-dispersing pigment can be prepared by, for example, causing a functional group or a functional group-containing molecule to bind to the pigment surface via a chemical bond such as a coordinate bond or a graft bond by means of a physical treatment such as vacuum plasma or chemical treatment. The self-dispersing pigment can be obtained by, for example, the method described in JP-A No. 8-3498.

In addition, commercially available self-dispersing pigments can be used. Examples of preferable self-dispersing pigments include a MICROJET (trade name) series manufactured by Orient Chemical Industries Co., Ltd., a CAB-O-JET® series manufactured by Cabot Corporation, and the like.

As the self-dispersing pigment, in view of improving aggregation properties and rubbing resistance of the ink by the reaction between the pigment and the aggregation component in the case of using the treatment liquid described below, self-dispersing pigments having a carboxyl group (—COOH) on the pigment surface are preferable.

An average particle size of the self-dispersing pigment is preferably from 10 nm to 300 nm and more preferably 40 nm to 150 nm, in view of improving storage stability of the ink and suppressing nozzle blocking The content of the self-dispersing pigment based on the total mass of the ink composition is preferably from 1% by mass to 15% by mass in view of obtaining high density and the liquid stability of the ink composition. The content is more preferably from 2% by mass to 10% by mass in view of enhancing the jetting stability.

As the self-dispersing pigment, in view of further improving continuous jetting property of the ink, a pigment that forms a covalent bond with an anionic polymer can be preferably used. The pigment that forms a covalent bond with an anionic polymer contains at least one kind of anionic polymer and a pigment, and the pigment forms a covalent bond with the anionic polymer. The pigment that forms a covalent bond with an anionic polymer (hereinafter, also called an "anionic polymer-bonded pigment" or a "polymer-modified pigment") can disperse in an aqueous medium that constitutes an ink, without using an additional dispersant.

The pigment may be a pigment of a carbon product or the like that is oxidized using an oxidant for introducing an ionic group and/or an ionizable group onto the pigment surface. The oxidized pigment prepared in this manner has a group containing a larger amount of oxygen on the pigment surface.

Examples of the oxidant include oxygen gas, ozone, peroxide such as hydrogen peroxide, persulfates including sodium persulfate and potassium persulfate, hypohalites such as sodium hypochlorite, oxidizing acids such as nitric acid, sodium perchlorate, nitrogen oxide including NO$_2$, oxidants containing transition metals such as permanganate, osmium tetroxide, and chromium oxide, and eerie ammonium nitrate, but the oxidant is not limited to these. A mixture of oxidants, particularly, a mixture of gaseous oxidants such as oxygen and ozone may or may not be used.

A modified pigment prepared by introducing an ionic group or an ionizable group by a surface modification method such as sulfonylation may or may not be used as the pigment.

Among the pigments, carbon black may be a multiphase aggregate that includes a carbon phase and a silicon-containing species phase in an embodiment, or a multiphase aggregate that includes a carbon phase and a metal-containing species phase in another embodiment. In another embodiment, the carbon black may not be a multiphase aggregate. If the silicon-containing species and/or the metal-containing species are (is) regarded as one phase of the aggregate just like the carbon phase, the multiphase aggregate that includes the carbon phase and the silicon-containing species phase can be considered to be a silicon-treated carbon black aggregate, and the multiphase aggregate that includes the carbon phase and the metal-containing species phase can be considered to be a metal-treated carbon black aggregate. The scope of the multiphase aggregate does not include a mixture of a disaggregated carbon black aggregate and a disaggregated silica or metal aggregate. Instead, the multiphase aggregate usable as carbon black includes at least one silicon-containing region or metal-containing region that converges on the surface or periphery (though the region is placed on the aggregate) of the aggregate and/or the inside of the aggregate. Therefore, the aggregate includes at least two phases. One of the phases is carbon, and the other phase is either or both of the silicon-containing species and the metal-containing species. The silicon-containing species that can be a portion of the aggregate does not bind to a carbon black aggregate as a silane coupling agent does, and practically becomes a portion of the same aggregate just like the carbon phase.

The metal-treated carbon black is an aggregate containing at least a carbon phase and a metal-containing species phase. The metal-containing species phase include compounds containing aluminum, zinc, magnesium, calcium, titanium, vanadium, cobalt, nickel, zirconium, tin, antimony, chromium, neodymium, lead, tellurium, barium, cesium, iron, and molybdenum. The metal-containing species phase can be dispersed in at least a portion of the aggregate and is a portion of the aggregate that the aggregate includes originally. The metal-treated carbon black may or may not include one or more types of metal-containing species phases. Moreover, the metal-treated carbon black may or may not include a silicon-containing species phase and/or a boron-containing species phase.

Details of the production of those multiphase aggregates are described in the specifications of U.S. Pat. No. 5,904,762, U.S. Pat. No. 5,877,238, U.S. Pat. No. 5,869,550, U.S. Pat. No. 5,830,930, Pamphlet of International Publication WO 96/37547, and the specifications of U.S. Pat. No. 6,017,980, U.S. Pat. No. 5,904,762, and U.S. Pat. No. 6,057,387.

A carbon product coated with silica can also be used as a pigment, and the carbon product is described in Pamphlet of International Publication WO 96/37547. In addition, any pigment coated with silica may or may not be used. In such a coated pigment a coupling agent that has functionality of being able to react with a coat, silica, or a metal phase provides may or may not be used so as to provide a necessary or desirable functional group to the pigment in a similar manner as in the case of the metal-treated carbon black and the multiphase aggregate.

The BET surface area of a pigment that is measured by nitrogen adsorption can be within a wide range, according to the characteristics desired for the pigment. For example, the pigment surface may be from about 10 $m^2/g$ to about 2,000 $m^2/g$ in an embodiment, may be from about 10 $m^2/g$ to about 1,000 $m^2/g$ in another embodiment, and may be from about 50 $m^2/g$ to about 500 $m^2/g$ in another embodiment. As a person skilled in the art knows, if pigments have the same particle structure, the larger the surface area, the smaller the particle size. The larger the surface area, the better. In addition, if a pigment is not immediately usable for a desired purpose, the pigment can be subjected to a size reduction technique or a pulverization technique of the conventional art, such as a milling medium, jet milling, microfluidization, or ultrasonic treatment, if necessary, so as to further reduce the particle size of the pigment. Moreover, when a pigment is a fine particle material containing an aggregate of primary particles of carbon black or the like, the pigment structure may be in a range of about 10 ml/100 g to about 1,000 ml/100 g in an embodiment, and may be in a range of about 40 ml/100 g to about 200 ml/100 g in another embodiment.

In the anionic polymer-bonded pigment, at least one kind of anionic group or an anionizable group binds to at least one kind of polymer which is bound to the pigment. Herein, the "anionizable group" refers to a group that can be ionized to exhibit an anionic property. For example, the anionic group or the anionizable group can be in the form of an acidic group or a salt of an acidic group. The acidic group can be in the form of a derivative of an organic acid, such as a carboxylic group, a hydroxyl group, a sulfonic group, a sulfuric group, or a phosphonic group. The anionic group or the anionizable group can provide a functional group involved in an aggregation reaction between a fixing agent liquid and the anionic polymer-bonded pigment that is caused on the surface of a recording medium.

The polymer that the anionic polymer-bonded pigment contains is not particularly limited, and examples thereof include polystyrene, a styrene/acryl copolymer, a styrene/acryl ester copolymer, a polyacryl ester, a polymethacryl ester, polyethyl acrylate, a styrene/butadiene copolymer, a butadiene copolymer, polyurethane, an acrylonitrile/butadiene copolymer, a chloroprene copolymer, a crosslinked acryl resin, a crosslinked styrene resin, vinylidene fluoride, a benzoguanamine resin, a polyethylene resin, a polypropylene resin, a styrene/methacryl ester copolymer, a styrene/acrylamide copolymer, n-isobutyl acrylate, vinyl acetate, acrylamide, polyvinylacetal, a rosin resin, a vinylidene chloride resin, an ethylene/vinyl acetate copolymer, a vinyl acetate/acryl copolymer, and a vinyl chloride resin. The polymer can be supported on the pigment in an amount of from about 20% by mass to about 30% by mass based on the total mass of the anionic polymer-bonded pigment.

The polymer-modified pigment is prepared from the modified pigment described below by a step including the polymerizing at least one kind of polymerizable monomer. A polymer group may be various different types of polymers that include a homopolymer, a random copolymer, a block copolymer, a graft copolymer, a branched copolymer, an alternating copolymer and/or the like.

Generally, there are three types of methods usable for preparing a pigment that has at least one kind of polymer group which is bound to the pigment. The methods are called steps of "grafting onto", "grafting through", and "grafting from". The "grafting from" step generally includes polymerizing a monomer in the presence of a modified pigment having at least one kind of polymerizable group which is bound to the pigment. The polymer which is bound to the pigment can three-dimensionally hinder the growing polymer chain from reaching the polymerizable group on the pigment surface. Accordingly, the presence of the polymer which is bound to the pigment can restrict another binding. Herein, the "grafting from" step typically includes forming an initiation point on the pigment surface and directly polymerizing a monomer from the initiation point.

It is preferable that the polymer-modified pigment be prepared by the "grafting from" step. Any type of the step known in the related technical field may be used as the "grafting from" step. For example, the polymer-modified pigment may be prepared by a step in which the pigment is polymerized "from" a pigment to which at least one kind of polymerizable monomer is bound and which has at least one kind of transferable atom or group. Alternatively, radical polymerization of the related art in which at least one kind of polymerizable monomer is polymerized "from" a pigment to which an initiation group is bound may be used. It is preferable that the polymer-modified pigment be prepared by using a polymerization step that includes a step of polymerizing at least one kind of polymerizable monomer from a pigment to which at least one kind of transferable atom or group is bound. Examples of such a polymerization step include Atom Transfer Radical Polymerization (ATRP), Stable Free Radical polymerization (SFR), Reversible Addition-Fragmentation Chain Transfer polymerization (RAFT), and ionic polymerization such as Group Transfer Polymerization (GTP). Regarding the chain terminal in a resting state, these polymerization reactions typically include a growing chain terminal that has a relatively low steady concentration, but this is not always the case. When the chain is in a resting state, the chain terminal includes a transferable atom or group. The chain terminal in a resting state may be converted into a growing chain terminal by losing the transferable atom or group.

ATRP, SFR, and RAFT are living radical polymerization that is used for preparing a polymer material from a radically polymerizable monomer that uses an initiator including a radically transferable atom or group. The type of the transferred group varies with the type of the respective polymerization reactions. For example, ATRP typically includes transfer of a halogen group. The detail of the ATRP process is described in, for example, Journal of the American Chemical society 1995 117, 5614 by Matyjaszewski, ACS Symposium Series 768, and Handbook of Radical Polymerization (K. Matyjaszewski, T. P. Davis (editors): Wiley-Interscience, Hoboken 2002). The SFR polymerization generally includes the transfer of a stable free radical group such as nitroxyl group. The detail of nitroxide-mediated polymerization is described in, for example, Chapter 10 in Handbook of Radical Polymerization (K. Matyjaszewski, T. P. Davis (editors): Wiley-Interscience, Hoboken 2002). For example, Accounts of Chemical Research 2004 37(5), 312-325 (C. L. McCormick and A. B. Lowe) describes many other groups. However, in the RAFT process described in Macromolecules 1998 31(16), 5559 (Chiefari, et al.), a thiocarbonylthio group is transferred. In terms of this point, RAFT polymerization is different from the nitroxide-mediated polymerization. In contrast, GTP is a polymerization technique in which an anionic or cationic polymerizable monomer is polymerized from an initiator containing an ionically transferable atom or group such as silyl group (for example, a trimethylsilyl group). The detail of the GTP process is described in, for example, Journal of the American Chemical Society 1983 105(17), 5706-5708 (Webster, et al.) and Encyclopedia of Polymer Science and Engineering 1987 7, 580-588 (Webster).

Resin-Coated Pigment

In the invention, it is preferable that the pigment contained as a colorant be dispersed in a liquid with coating a part or all of the pigment with a water-insoluble resin. In this case, the entire surface of the pigment particles is not necessarily coated, and at least a portion of the particle surface may be coated according to circumstances. In this manner, PVP, PVA, or PEG described below that is contained in the ink composition acts effectively to suppress jetting failure or bent jetting without contributing to disperse the pigment. In addition, it is possible to make the pigment particles be present in a state of having a fine particle size, and a high degree of dispersion stability is obtained. Accordingly, high-definition images having excellent color density can be formed over a long period of time.

Examples of the water-insoluble resin include: [1] a polymer that contains: (a) a repeating unit represented by the following Formula (1); and (b) a repeating unit having an ionic group; and [2] a polymer that contains: a structural unit derived from (c) a salt forming group-containing monomer; and (d) a styrene-based macromer and/or a structural unit derived from (e) a hydrophobic monomer. Among these, the polymer [1] is preferable. Regarding the detail of the polymer [2], paragraphs 0012 to 0031 in JP-A No. 2009-84501 can be referred to.

The word "water-insoluble" means that when a polymer is mixed with an aqueous medium at 25° C., the amount of the polymer that dissolves in the aqueous medium is 10% by mass or less in terms of a mass ratio based on the total amount of the polymer mixed.

Hereinafter, the polymer [1] that contains the (a) repeating unit represented by Formula (1) and the (b) repeating unit having an ionic group will be described in detail.

This polymer contains at least one kind of repeating unit represented by the following Formula (1) and at least one kind of the repeating unit having an ionic group. The polymer can further contain other structural units such as a hydrophobic repeating unit other than the repeating unit represented by Formula (1) or a hydrophilic repeating unit having a nonionic functional group if necessary.

<(a) Repeating Unit Represented by Formula (1)>

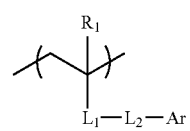

Formula (1)

Formula (1)

In Formula (1), $R_1$ represents a hydrogen atom, a methyl group, or a halogen atom (for example, a chlorine atom, a bromine atom, or an iodine atom), $L_1$ represents *—COO—, *—COO—, *—CONR$_2$—, *—O—, or a substituted or unsubstituted phenylene group, and $R_2$ represents a hydrogen atom or an alkyl group having 1 to 10 carbon atoms. The asterisk (*) in the group represented by $L_1$ represents a bond linked to a main chain. $L_2$ represents a single bond, or a divalent linking group. Ar represents a monovalent group derived from an aromatic ring.

In Formula (1), $R_1$ represents a hydrogen atom, a methyl group, or a halogen atom, and preferably represents a methyl group.

$L_1$ represents *—COO—, *—COO—, *—CONR$_2$—, *—O—, or a substituted or unsubstituted phenylene group. When $L_1$ represents a phenylene group, the phenylene group is preferably unsubstituted. $R_2$ represents a hydrogen atom or an alkyl group having 1 to 10 carbon atoms.

$L_2$ represents a single bond or a divalent linking group. The divalent linking group is preferably a linking group having 1 to 30 carbon atoms, more preferably a linking group having 1 to 25 carbon atoms, even more preferably a linking group having 1 to 20 carbon atoms, and particularly preferably a linking group having 1 to 15 carbon atoms.

Specific examples thereof include an alkylene oxy group having 1 to 25 carbon atoms (preferably 1 to 10 carbon atoms), an imino group (—NH—), a sulfamoyl group, a divalent linking group containing an alkylene group such as an alkylene group having 1 to 20 carbon atoms (preferably 1 to 15 carbon atoms) or an ethylene oxide group [—(CH$_2$CH$_2$O)$_n$—, n=1 to 6], and a group that is a combination of two or more kinds of these groups.

Ar represents a monovalent group derived from an aromatic ring.

Examples of the aromatic ring of the monovalent group represented by Ar include a benzene ring, a condensed aromatic ring having 8 or more carbon atoms, an aromatic ring formed of condensed hetero rings, and an aromatic ring formed of two or more condensed benzene rings, but the invention is not limited to these.

The "condensed aromatic ring having 8 or more carbon atoms" is an aromatic ring formed of at least two or more condensed benzene rings, or an aromatic compound having 8 or more carbon atoms that has a ring structure constituted with at least one kind of aromatic ring and an alicyclic hydrocarbon condensed with the aromatic ring. Specific examples thereof include naphthalene, anthracene, fluorene, phenanthrene, acenaphtene, and the like.

The "aromatic ring formed of condensed hetero rings" is a compound in which an aromatic compound (preferably a benzene ring) not having a hetero atom is condensed with a cyclic compound having a hetero atom. Herein, the cyclic compound having a hetero atom is preferably a 5- or 6-membered ring. A nitrogen atom, an oxygen atom, or a sulfur atom is preferable as the hetero atom. The cyclic compound having a hetero atom has a single hetero atom or plural hetero atoms. When the compound has plural hetero atoms, the plural hetero atoms may be the same as or different from each other.

Specific examples of the aromatic ring condensed with a hetero ring include phthalimide, acridone, carbazole, benzoxazole, benzothiazole, and the like.

Specific examples of monomers that form the repeating unit represented by Formula (1) include (meth)acrylates, (meth)acrylamides, styrenes, and vinyl monomers such as vinyl esters.

The polymer has a hydrophobic structural unit having an aromatic ring that binds to main chain-forming atoms via the above linking group. That is, the aromatic ring does not directly bind to the main chain-forming atoms of the polymer. Therefore, an appropriate distance is maintained between the hydrophobic aromatic ring and the hydrophilic structural unit. Consequently, the water-insoluble resin easily interacts with the pigment, and the water-insoluble resin is firmly adsorbed onto the pigment, whereby the dispersibility of the pigment is further improved.

Specific examples of the monomer that forms the repeating unit represented by Formula (1) include the following monomers, but the invention is not limited to these monomers.

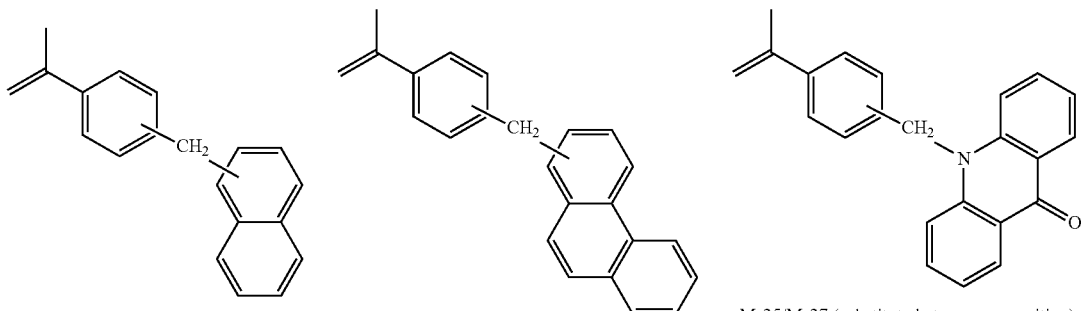

M-25/M-27 (substituted at m- or p- position)

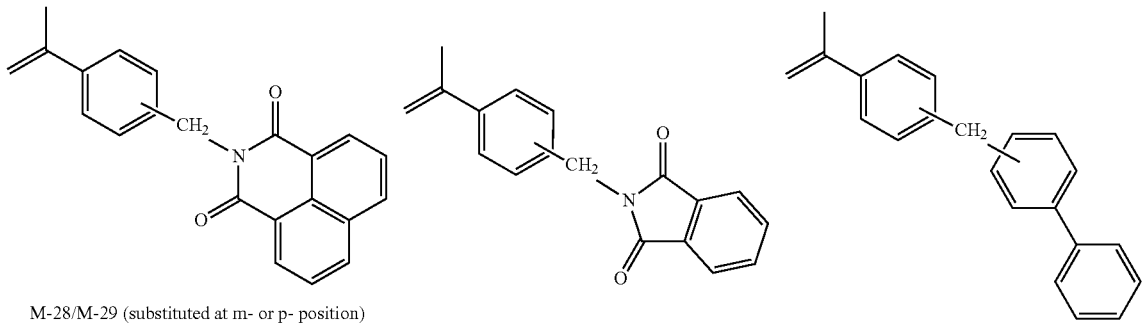

M-28/M-29 (substituted at m- or p- position)

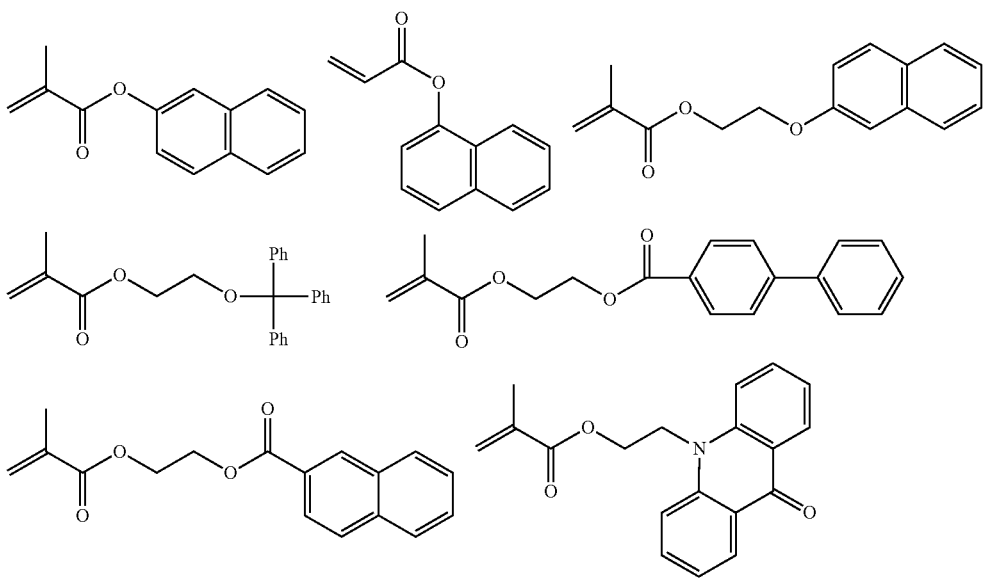

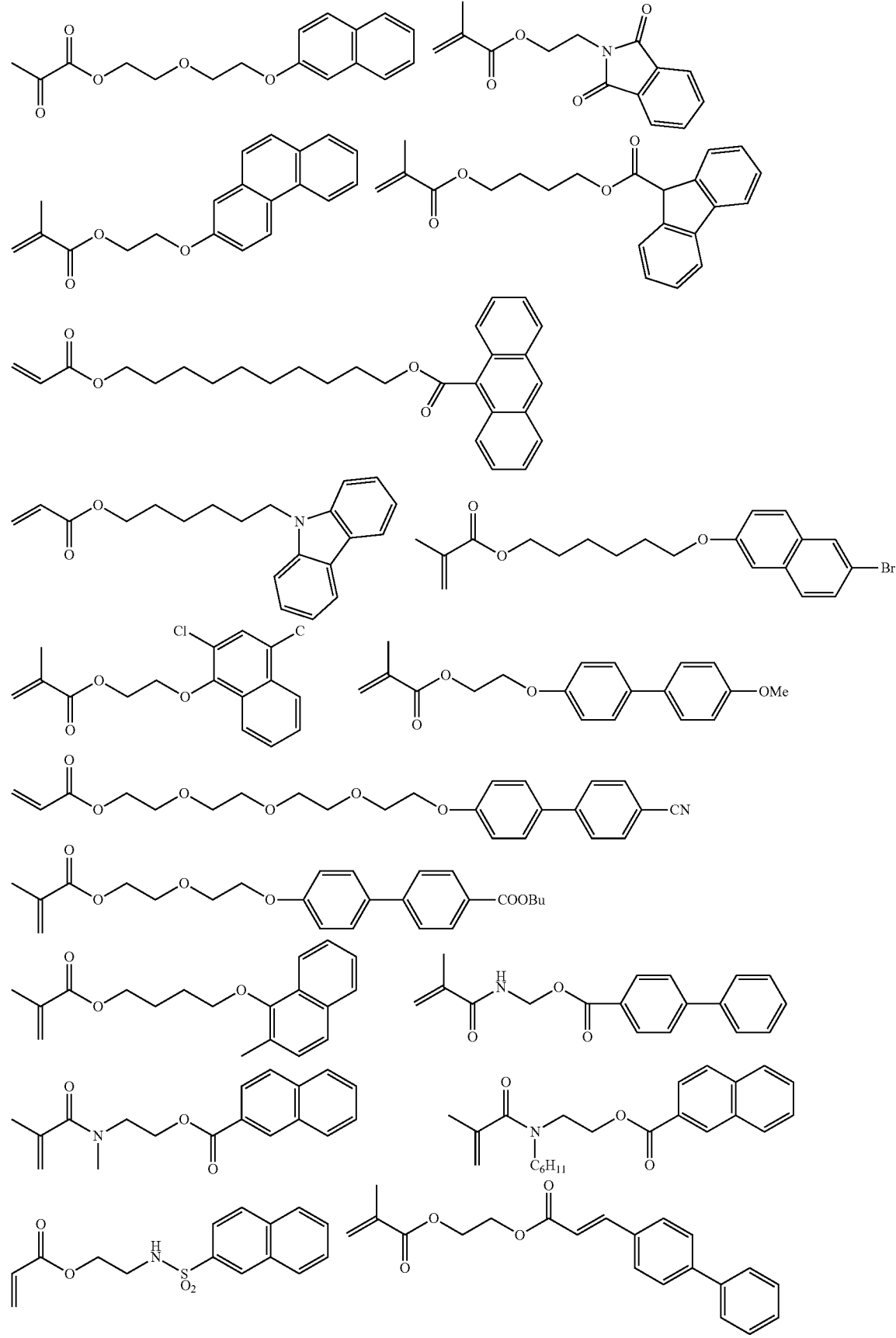

-continued

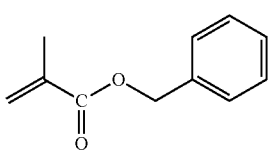 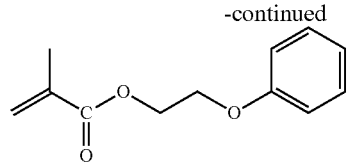 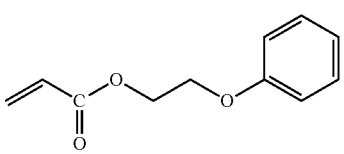

Ar in the repeating unit (a) represented by Formula (1) is preferably a monovalent group derived from benzyl (meth) acrylate, phenoxyethyl acrylate, phenoxyethyl methacrylate, acridone, or phthalimide, in view of the excellent dispersion stability of the coated pigment.

One kind of the repeating unit can be used alone, or two or more kinds thereof can be used in combination.

The content of the repeating unit represented by Formula (1) in the polymer is preferably in a range of 5% by mass to 25% by mass, and more preferably in a range of 10% by mass to 18% by mass, based on the total mass of the polymer. If the content is 5% by mass or more, occurrence of image failures such as image defect tends to be markedly inhibited. Moreover, if the content is 25% by mass or less, problems relating to production suitability that result from solubility reduction of the polymer in a polymerization reaction solution (for example, methyl ethyl ketone) tend not to arise.

<Additional Hydrophobic Repeating Units>

The polymer [1] may or may not further contain a hydrophobic repeating unit other than the repeating unit represented by Formula (1), as a hydrophobic structural unit. Examples of such an additional hydrophobic repeating unit include: structural units derived from (meth)acrylates, (meth) acrylamides, styrenes, and vinyl monomers such as vinyl esters that are not classified to hydrophilic structural units (that do not have a hydrophilic functional group, for example); and hydrophobic structural units having an aromatic ring which is attached to a main chain-forming atom via a linking group. One kind of these structural units can be used alone, and two or more kinds thereof can be used in combination.

Examples of the (meth)acrylates include alkyl (meth)acrylate such as methyl (meth)acrylate, ethyl (meth)acrylate, butyl (meth)acrylate, isobutyl (meth)acrylate, and hexyl (meth)acrylate. Among these, alkyl esters of (meth)acrylic acid that have 1 to 4 carbon atoms are preferable. Among the above, methyl (meth)acrylate, ethyl (meth)acrylate, and butyl (meth)acrylate are more preferable, and methyl (meth)acrylate and ethyl (meth)acrylate are even more preferable.

Examples of the (meth)acrylamides include (meth)acrylamides such as N-cyclohexyl (meth)acrylamide, N-(2-methoxyethyl)(meth)acrylamide, N,N-diallyl(meth)acrylamide, and N-allyl(meth)acrylamide.

Examples of the styrenes include styrene, methyl styrene, dimethyl styrene, trimethyl styrene, ethyl styrene, isopropyl styrene, n-butyl styrene, tert-butyl styrene, methoxystyrene, butoxystyrene, acetoxystyrene, chlorostyrene, dichlorostyrene, bromostyrene, chloromethyl styrene, hydroxystyrene protected with a group (for example, t-Boc) that can be deprotected by an acidic substance, methyl vinyl benzoate, α-methyl styrene, vinyl naphthalene, and the like. Among these, styrene and α-methyl styrene are preferable.

Examples of the vinyl esters include vinyl acetate, vinyl chloroacetate, vinyl propionate, vinyl butyrate, vinyl methoxyacetate, and vinyl esters such as vinyl benzoate. Among these, vinyl acetate is preferable.

<(b) Repeating Unit Having an Ionic Group>

Examples of the repeating unit having an ionic group include repeating units derived from monomers having an ionic group such as a carboxyl group, a sulfo group, and a phosphonate group. Examples thereof include vinyl monomers having an ionic functional group, such as (meth)acrylic acid, (meth)acrylates, (meth)acrylamides, and vinyl esters. The repeating unit having an ionic group can be introduced into the polymer [1] by using the corresponding monomer for polymerization. Alternatively, the polymer [1] may be obtained by introducing an ionic group into a polymer chain obtained after polymerization.

Among these, a repeating unit derived from acrylic acid or methacrylic acid is preferable. In an embodiment, it is preferable that the polymer [1] contains either or both of the repeating unit derived from acrylic acid and the repeating unit derived from methacrylic acid.

In an embodiment, the content of the (b) repeating unit having an ionic group in the polymer [1] is preferably 15% by mass or less based on the total mass of the polymer, and the polymer [1] preferably contains at least a structural unit derived from (meth)acrylic acid as the repeating unit having an ionic group.

If the content of the (b) repeating unit having an ionic group is 15% by mass or less based on the total mass of the polymer, dispersion stability can become excellent. The content of the (b) repeating unit having an ionic group is preferably from 5% by mass to 15% by mass, and more preferably 7% by mass to 13% by mass, in view of excellent dispersion stability.

The polymer [1] can be stably present in an aqueous ink composition. Moreover, the polymer can mitigate, for example, sticking and deposition of aggregates caused in an ink jet head, and exhibit excellent removability to the stuck aggregate. In view of this point, the polymer [1] may or may not further contain a hydrophobic structural unit other than the the (a) repeating unit represented by Formula (1) and a hydrophilic structural unit other than the "(b) repeating unit having an ionic group".

<Hydrophilic Repeating Unit>

Examples of the additional hydrophilic structural unit described above include structural units derived from monomers having a nonionic hydrophilic group, such as vinyl monomers having a hydrophilic functional group including (meth)acrylates, (meth)acrylamides, vinyl esters and the like having a hydrophilic functional group.

Examples of the "hydrophilic functional group" include a hydroxyl group, an amino group, an amide group (having an unsubstituted nitrogen atom), and an alkylene oxide such as polyethylene oxide and polypropylene oxide as described below.

The monomer that forms the hydrophilic repeating unit having a nonionic hydrophilic group is not particularly limited and can be selected from known monomers, as long as the monomer has a functional group that can form a polymer of an ethylenically unsaturated bond or the like and a nonionic hydrophilic functional group. Specific preferable examples thereof include hydroxyethyl (meth)acrylate, hydroxybutyl (meth)acrylate, (meth)acrylamide, aminoethyl acrylate, aminopropyl acrylate, and (meth)acrylate containing an alkylene oxide polymer.

The hydrophilic repeating unit having a nonionic hydrophilic group can be formed in the polymer [1] by using the corresponding monomer for polymerization. Alternatively, the polymer [1] may be obtained by introducing a hydrophilic functional group into a polymer chain obtained after polymerization.

The hydrophilic repeating unit having a nonionic hydrophilic group is more preferably a hydrophilic structural unit having an alkylene oxide structure. In view of hydrophilicity, the alkylene moiety of the alkylene oxide structure is preferably an alkylene moiety having 1 to 6 carbon atoms, more preferably an alkylene moiety having 2 to 6 carbon atoms, and particularly preferably an alkylene moiety having 2 to 4 carbon atoms. In addition, a degree of polymerization of the alkylene oxide structure is preferably 1 to 120, more preferably 1 to 60, and particularly preferably 1 to 30.

In examples of preferable embodiments of the hydrophilic repeating unit having a nonionic hydrophilic group, a hydrophilic repeating unit having a hydroxyl group is also included. The number of a hydroxyl group in the repeating unit is not particularly limited. In view of the hydrophilicity of the water-insoluble resin and the compatibility between the repeating unit and a solvent or other monomers at the time of polymerization, the number of hydroxyl group is preferably from 1 to 4, more preferably from 1 to 3, and particularly preferably from 1 to 2.

In the composition of the polymer [1], the proportion between the hydrophilic repeating unit and the hydrophobic repeating unit (including the structural repeating unit represented by Formula (1)) may be influenced by the degree of hydrophilicity or hydrophobicity of the respective repeating units. In an embodiment, the content of the hydrophilic repeating unit in the composition of the polymer [1] is preferably 15% by mass or less. At this time, the content of the hydrophobic repeating unit is preferably larger than 80% by mass, and more preferably 85% by mass or more, based on the total mass of the polymer [1].

If the content of the hydrophilic repeating unit is 15% by mass or less, the amount of a component that dissolves alone in an aqueous medium can be reduced, and various performances such as dispersing of the pigment may become excellent. Accordingly, excellent ink jetting property can be obtained during ink jet recording.

The content of the hydrophilic repeating unit is preferably in a range of larger than 0% by mass and equal to or less than 15% by mass, more preferably from 2% by mass to 15% by mass, even more preferably from 5% by mass to 15% by mass, and still more preferably from 8% by mass to 12% by mass, based on the total mass of the polymer [1].

The content of the aromatic ring is preferably 27% by mass or less, more preferably 25% by mass or less, and even more preferably 20% by mass or less, based on the total mass of the polymer [1]. Within the above range, the content is preferably from 15% by mass to 20% by mass, and more preferably from 17% by mass to 20% by mass. If the content of the aromatic ring is within the above range, rubbing resistance can be improved.

Specific examples of the polymer [1] will be described below. A molar ratio (% by mass) between copolymerization components (monomers that form the repeating unit), a weight average molecular weight (Mw), and an acid value of the respective polymers are described in a parentheses thereto, but the invention is not limited to the following.

Phenoxyethyl acrylate/methyl methacrylate/acrylic acid copolymer (molar ratio: 50/45/5, MW: 45000, acid value: 31.2 mg KOH/g)

Phenoxyethyl acrylate/benzyl methacrylate/isobutyl methacrylate/methacrylic acid copolymer (molar ratio: 30/35/29/6, MW: 44000, acid value: 31.3 mg KOH/g)

Phenoxyethyl methacrylate/isobutyl methacrylate/methacrylic acid copolymer (molar ratio: 50/44/6, MW: 46000, acid value: 31.3 mg KOH/g)

Phenoxyethyl acrylate/methyl methacrylate/ethyl acrylate/acrylic acid copolymer (molar ratio: 30/55/10/5, MW: 47000, acid value: 31.2 mg KOH/g)

Benzyl methacrylate/methyl methacrylate/methacrylic acid copolymer (molar ratio: 60/30/10, MW: 42000, acid value: 52.1 mg KOH/g)

(M-25/M-27) mixture/ethyl methacrylate/methacrylic acid copolymer (molar ratio: 15/75/10, MW: 49400, acid value: 65.2 mg KOH/g)

(M-25)/ethyl methacrylate/methacrylic acid copolymer (molar ratio: 18/69/13, MW: 41600, acid value: 84.7 mg KOH/g)

(M-28/M-29) mixture/ethyl methacrylate/methacrylic acid copolymer (molar ratio: 15/85/10, MW: 38600, acid value: 65.2 mg KOH/g)

(M-28)/ethyl methacrylate/methacrylic acid copolymer (molar ratio: 20/73/7, MW: 45300, acid value: 45.6 mg KOH/g)

In view of pigment dispersibility and storage stability, the acid value of the water-insoluble resin is preferably from 30 mg KOH/g to 100 mg KOH/g, more preferably 30 mg KOH/g to 85 mg KOH/g, and particularly preferably from 50 mg KOH/g to 85 mg KOH/g.

The acid value is defined as mass (mg) of KOH required for completely neutralizing 1 g of the water-insoluble resin, and measured by the method described in JIS standards (JIS K0070, 1992).

The molecular weight of the water-insoluble resin is preferably 30,000 or more, more preferably from 30,000 to 150,000, even more preferably from 30,000 to 100,000, and particularly preferably from 30,000 to 80,000, in terms of a weight average molecular weight (Mw). If the molecular weight is 30,000 or more, a steric repulsion effect of the resin as a dispersant tends to become excellent, and due to the steric effect, the resin can be easily adsorbed onto the pigment.

In addition, the molecular weight is preferably from about 1,000 to about 100,000, and particularly preferably from about 3,000 to about 50,000, in terms of a number average molecular weight (Mn). If the number average molecular weight is within the above range, the function of the resin as a film that coats the pigment or the function of the ink composition as a coating film can be more effectively exerted. In an embodiment, it is preferable that the polymer [1] be used in the form of a salt of an alkali metal or an organic amine.

The molecular weight distribution (weight average molecular weight/number average molecular weight) of the water-insoluble resin is preferably in a range of from 1 to 6, and more preferably in a range of from 1 to 4. If the molecular weight distribution is within the above range, dispersion stability and jetting stability of the ink can be improved.

The number average molecular weight and the weight average molecular weight are measured by Gel Permeation Chromatography (GPC). They are molecular weights that detected in THF as a solvent by using HLC-8020GPC (trade name, manufactured by Tosoh Corporation) as GPC, three columns of TSKgel, SUPER MULTIPORE HZ-H (trade name, manufactured by Tosoh Corporation, 4.6 mm ID×15 cm) as a column, and THF (tetrahydrofuran) as an eluent, and expressed in terms of polystyrene as a standard substance.

The water-insoluble resin can be synthesized by various polymerization methods such as solution polymerization, precipitation polymerization, suspension polymerization, precipitation polymerization, bulk polymerization, and emulsion polymerization. The polymerization reaction can be performed by a known operation such as a batch reaction, a semicontinuous reaction, or a continuous reaction. Examples of the polymerization initiation method include a method of using a radical initiator, a method of light irradiation or radiation irradiation, and the like. These polymerization methods and polymerization initiation methods are described in, for example, Teiji TSURUDA, a revised version of "Polymer Synthesis Method" (published by THE NIKKAN KOGYO SHIMBUN, LTD., 1971) or Takayuki OTSU and Masayoshi KINOSHITA, "Experimental Method for Polymer Synthesis", Kagaku Dojin Publishing Co., Ltd, published in 1972, pp 124 to 154.

Among the polymerization methods, solution polymerization that uses a radical initiator is particularly preferable. Examples of the solvent used in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. One kind of the solvent may be used alone, or two or more kinds thereof may be used concurrently. In addition, the solvent may be used in the form of a solvent mixed with water, or in the form of a solvent not containing water. The polymerization temperature needs to be set in connection with the molecular weight of the polymer to be generated, the type of initiator, and the like. The polymerization temperature is generally from about 0° C. to 100° C. In an embodiment, it is preferable that the polymerization be performed in a range of from 50° C. to 100° C. The reaction pressure can be selected appropriately. The reaction pressure is generally from 1 $kg/cm^2$ to 100 $kg/cm^2$, and in an embodiment, the reaction pressure is particularly preferably from about 1 $kg/cm^2$ to 30 $kg/cm^2$. The reaction time is generally from about 5 hours to about 30 hours. The obtained resin may be purified by reprecipitation or the like.

When the pigment is resin-coated particles obtained by coating the pigment particles with the water-insoluble resin, it is preferable that the pigment be coated with the water-insoluble resin by phase inversion emulsification in view of dispersion stability.

The phase inversion emulsification is basically a self-dispersing (phase inversion emulsification) method that includes dispersing a melt mixture of a resin and a pigment having self-dispersibility or solubility in water. The melt mixture may or may not further contain a hardener and/or a polymer compound. Herein, the melt mixture refers to any of materials in a state where plural components are mixed with each other without being dissolved, a state where the components are dissolved and mixed, or a state including the above two states.

Examples of more specific production methods of the phase inversion emulsification and acid precipitation include the methods described in JP-A No. 9-151342 and JP-A No. 10-140065.

The resin-coated pigment is suitably obtained by a process of preparing the pigment as a dispersion of the resin-coated pigment by using the water-insoluble resin by means of a method including the following steps (1) and (2). The ink composition can be prepared by a method of making the dispersion of the resin-coated pigment obtained by the above preparation step into an aqueous ink by using water and an organic solvent together.

Step (1): a step of obtaining a dispersion by dispersing a mixture containing a water-insoluble resin, an organic solvent, a neutralizer, a pigment, and water by stirring or the like.

Step (2): a step of removing the organic solvent from the dispersion.

The stirring method is not particularly limited, and a generally used mixing and stirring device or optionally a dispersing machine such as an ultrasonic dispersing machine, a high-pressure homogenizer, or a beads mill can be used.

Examples of preferable organic solvents include an alcohol-based solvent, a ketone-based solvent, and an ether-based solvent, and details of these will be described in the following section of the resin particle. In addition, the neutralizer is used to create an emulsion state or a dispersion state in which a part or all of dissociable groups are neutralized, and a specific copolymer is stabilized in water. The detail of the neutralizer will be described below.

In the step (2), the organic solvent is evaporated from the dispersion obtained by the step (1) by a common method such as distillation under reduced pressure. In this manner, phase inversion to an aqueous phase is caused, whereby a dispersion of resin-coated pigment particles in which the surface of pigment particles is coated with a copolymer can be obtained. The dispersion obtained by the step (2) is in a state where the organic solvent practically has been removed, and the content of the organic solvent is preferably 0.2% by mass or less, and more preferably 0.1% by mass or less. More specific examples of the ink composition preparation method include a method that includes (i) a step of mixing a copolymer having an anionic group or a solution obtained by dissolving the copolymer in an organic solvent with a basic compound (neutralizer) for neutralization, (ii) a step of mixing the obtained mixed liquid with a pigment to prepare a suspension, and then dispersing the pigment by using a dispersing machine or the like to obtain a pigment dispersion, and (iii) a step of coating the pigment with a specific copolymer having an anionic group by removing the organic solvent by, for example, distillation, and dispersing the pigment in an aqueous medium to prepare an aqueous dispersion.

More specific information can be obtained with reference to the disclosure of JP-A No. 11-209672 and JP-A No. 11-172180.

The dispersion treatment can be performed by using, for example, a ball mill, a roll mill, a beads mill, a high-pressure homogenizer, a high-speed stirring type dispersion machine, or an ultrasonic homogenizer.

The total content (based on mass) of the self-dispersing pigment and/or the resin-coated pigment in which at least a portion of the surface of pigment particles is coated with the water-insoluble resin in the ink composition is preferably from 0.1% by mass to 15% by mass, more preferably from 1% by mass to 10% by mass, and particularly preferably from 1% by mass to 7% by mass, based on the total mass of the ink composition.

(PVP, PVA, and PEG)

The ink composition contains one or two or more selected from polyvinylpyrrolidone (PVP), polyvinyl alcohol (PVA), and polyethylene glycol (PEG). Containing the PVP and/or the like, the ink composition can have, regardless of the inclusion of both the below-described resin particles and wax particles in the ink composition, properties to make it difficult for the adherend of ink to be deposited on the periphery of the nozzle holes, and make it easy to remove the adherend by wiping or the like even if the ink is stuck to the periphery of the nozzle holes. Accordingly, if the ink composition is used, it is possible to inhibit the bent jetting and jetting failure of the ink that are caused when the ink is used in a state where the jetting of ink and the suspension of jetting are repeated, and the ink jetting property and the formability of desired high-definition images can be stabilized.

The content of PVP, PVA, and PEG is in a range of equal to or more 0.01% by mass and less than 1.00% by mass based on the total mass of the ink composition. The inclusion of the PVP and/or the like in the ink composition in a relatively small amount as above may improve the ink jetting property and image formability without thickening the ink.

If the content of the PVP and the like is less than 0.01% by mass based on the total mass of the ink composition, the amount thereof added to the ink composition may be insufficient. Accordingly, precipitation and deposition of the resin particles and wax particles may not be suppressed in some cases. Moreover, if the content of the PVP and the like is 1.00% by mass or more based on the total mass of the ink composition, the amount thereof added to the ink composition may be too much. Accordingly, the ink may easily stick to the periphery of the nozzle holes, and the ink is thickened, whereby jetting failure or color missing of images may occur in some cases.

In view of resolving the bent jetting and jetting failure of the ink that are caused when the ink is jetted again after the suspension of jetting (, specifically, in view of suppressing color missing and improving the accuracy of landing position), the content of the PVP and the like is preferably from 0.01% by mass to 0.5% by mass based on the total mass of the ink composition. Moreover, in view of securing jetting stability over a long period of time, the content is from 0.25% by mass to 0.5% by mass, more preferably from 0.05% by mass to 0.2% by mass, and particularly preferably from 0.05% by mass to 0.1% by mass.

Herein, modified polyvinyl alcohols, which are those modified with various groups such as an acetoacetyl group, a carboxyl group, an anionic group such as a hydroxyl group, and a silanol group, are also included in the scope of PVA.

(Wax Particle)

The ink composition contains at least one kind of wax particle that is insoluble or hardly-soluble in water. Containing the wax particle, rubbing resistance of the image formed of the ink composition can be further improved. On the other hand, when the ink composition contains both the wax particle and the resin particle describe later, the ink tends to be easily stuck to and deposited on the periphery of the nozzle holes. However, the bent jetting or jetting failure can be suppressed by the inclusion of the PVP and/or the like in the ink.

The state where the wax particle is "insoluble or hardly-soluble in water" means that when the wax particle is dried for 2 hours at 105° C. and then dissolved in 100 g of water at 25° C., the amount of the wax particle dissolved is 15 g or less. In view of improving continuous jetting property and jetting stability of the ink, the amount of the wax particle dissolved is preferably 5 g or less and more preferably 1 g or less.

Examples of wax included in the wax particle include natural wax and synthetic wax.

Examples of the natural wax include petroleum wax, plant wax, and animal and plant wax.

Examples of the petroleum wax include paraffin wax, microcrystalline wax, and petrolatum wax, and examples of the plant wax include carnauba wax, candelilla wax, rice wax, Japanese wax, and the like. Examples of the animal wax include lanoline, beeswax, and the like.

Examples of the synthetic wax include synthetic hydrocarbon wax and modified wax.

Examples of the synthetic hydrocarbon wax include polyethylene wax, Fischer-Tropsch wax, and the like. Moreover, examples of the modified wax include a paraffin wax derivative, a montan wax derivative, a microcrystalline wax derivative, and derivatives of these.

Among the above wax, carnauba wax is preferable in view of improving the rubbing resistance of image and improving image strength in the post process (process for making a booklet) of image samples. In addition, paraffin wax and a derivative thereof, which contain hydrocarbon having 20 to 40 carbon atoms as a main component, are preferable in the respect that these have the excellent effect of improving glossiness of images or effect of holding moisture by suppressing evaporation of water from the nozzle tip.

In addition, polyethylene wax is preferable in the respect that the wax makes it easy to form uniform and excellent images due to the excellent compatibility thereof with a resin. Furthermore, polyethylene wax is easily modified. Glycol-modified polyethylene wax, which is modified polyethylene wax, can provide wettability resulting from glycol. Accordingly, the glycol-modified polyethylene wax is more preferable in the respect that the wax can more effectively improve jetting stability since it has the effect of improving wettability of the ink composition at the nozzle tip.

It is preferable that the wax particles be used together with an emulsifying dispersant. The emulsifying dispersant can be used by being selected from many emulsifying dispersants known in the related art. Examples of preferable emulsifying dispersants include low-molecular weight (preferably, weight average molecular weight of from 100 to 5,000) non-ionic surfactants, and examples of more preferable emulsifying dispersants include dispersants represented by the following Formula (W). Presumably, when the wax particles are used together with the emulsifying dispersant, a low-molecular weight nonionic surfactant may be mixed into the ink and then coexist with the pigment or resin particles, whereby the dispersion system may easily become unstable, and the precipitation and deposition of ink may easily occur. In this case, the effect (resolving the bent jetting and jetting failure of ink) obtained by using the ink can be more markedly exerted.

The weight average molecular weight is measured by Gel Permeation Chromatography (GPC) and is expressed in terms of polystyrene.

$$(R^3)_a\text{-}G\text{-}(D)_d \qquad \text{Formula (W)}$$

In Formula (W), $R^3$ represents a substituted or unsubstituted linear, branched, or cyclic alkyl group having 10 to 60 carbon atoms, an alkenyl group, an aralkyl group, or a substituted or unsubstituted aryl group. Examples of preferable $R^3$ include $C_gH_{2g+1}$ (g represents an integer of from 12 to 60), eicosyl, and docosanyl.

G represents a linking group having a valency of from 2 to 7, preferably represents a divalent- or trivalent-linking group or a single bond, and more preferably represents an alkylene group, an arylene group, or a complex group of these. These may be divalent linking groups into which a hetero atom or group such as oxygen, an ester group, or an amide group has been introduced.

D represents a polyoxyalkylene group represented by $(B)_n$-E, B represents $-CH_2CH_2O-$, $-CH_2CH_2CH_2O-$, $-CH(CH_3)CH_2O-$, or $-CH_2CH(OH)CH_2O-$, and n represents an integer of from 1 to 50. Herein, E represents a hydrogen atom, a substituted or unsubstituted alkyl group having 1 to 8 carbon atoms, an aryl group, an alkylcarbonyl group or an arylcarbonyl group, and preferably represents a hydrogen atom, a methyl group, an ethyl group, a propyl group, an acetyl group, a propionyl group, or a benzoyl group.

Each of a and d represents an integer of from 1 to 6. When a is 2 or more, plural $R^3$s may be the same as or different from each other. When d is 2 or more, plural RDs may be the same as or different from each other, and plural Es may be the same as or different from each other.

Regarding detailed and preferable embodiments of Formula (W), the disclosure of "dispersant represented by Formula 2)" described in paragraphs [0022] to [0026] in JP-A No. 2006-91780 can be referred to. Specific examples thereof include the following compounds.

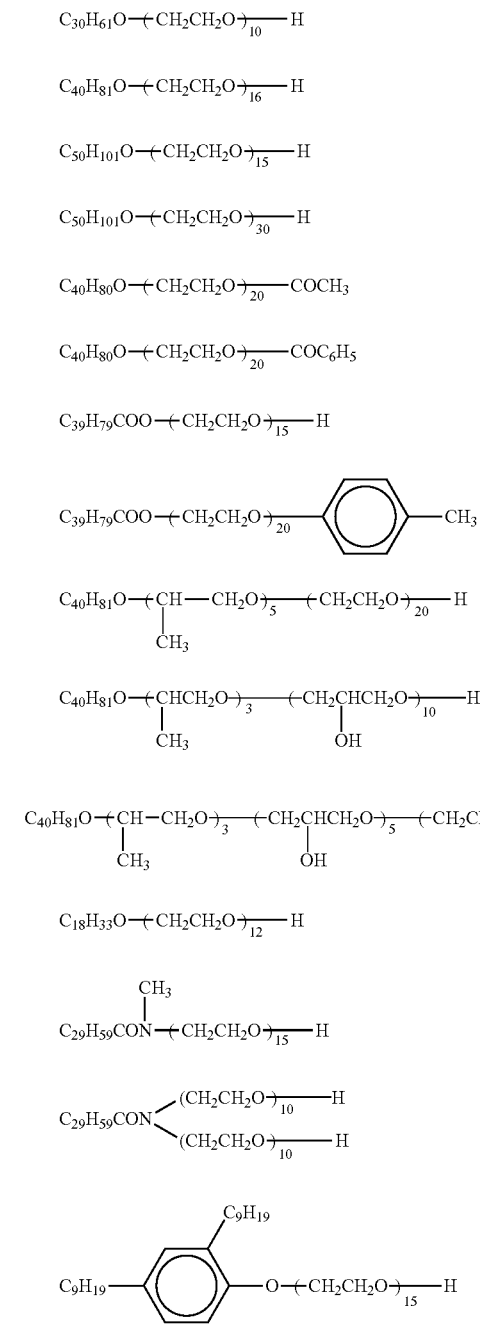

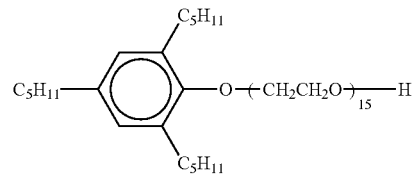

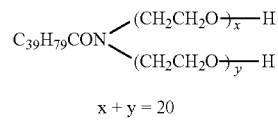

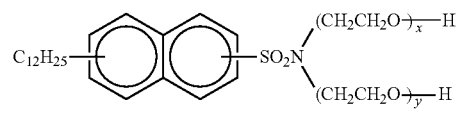

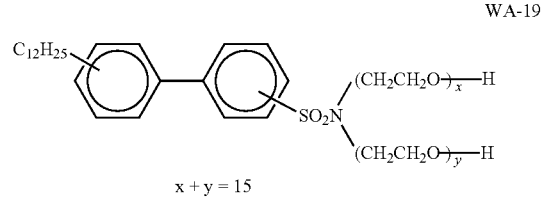

It is preferable that the wax particle be added to the ink composition in the form of a dispersion. As the solvent, water is preferable, but the invention is not limited thereto. For example, a general organic solvent can be selected appropriately and used at the time of dispersion. Regarding the organic solvent, the disclosure of paragraph [0027] in JP-A No. 2006-91780 can be referred to.

The content of the wax particle in the ink composition is preferably from 0.1% by mass to 5% by mass, more preferably from 0.5% by mass to 4% by mass, and even more preferably from 0.5% by mass to 3% by mass, based on the total mass of the ink. If the content of the wax particles is 0.1% by mass or more, the rubbing resistance of image can be further improved. If the content is 5% by mass or less, this may be advantageous in terms of the long-term storage stability of the ink. In an embodiment, the content is preferably from 0.5% by mass to 3% by mass in view of long-term jetting stability.

(Resin Particle)

The ink composition contains at least one kind of resin particles that are insoluble or hardly-soluble in water. If the ink composition contains the resin particles that are insoluble or hardly-soluble in water in addition to the resin that coats the pigment, the fixability of the ink composition to a recording medium and the rubbing resistance of the formed image can be further improved. When the ink composition contains both the resin particles and wax particles, generally, the ink is easily stuck to and deposited on the periphery of the jetting holes of the jetting head. However, since the ink composition in the exemplary embodiment of the present application contains the PVP and/or the like, the bent jetting or jetting failure can be further suppressed.

The state where the water-insoluble resin is insoluble or hardly-soluble in water means that when the resin is dried for 2 hours at 105° C. and then dissolved in 100 g of water at 25° C., the amount of resin dissolved is 15 g or less. In view of improving continuous jetting property and jetting stability of the ink, the dissolved amount is preferably 10 g or less, more preferably 5 g or less, and even particularly preferably 1 g or less. The dissolved amount is an amount obtained when the resin is neutralized 100% by using sodium hydroxide or acetic acid according to the type of the salt-forming group of the water-insoluble polymer.

Examples of the water-insoluble resin particles include thermoplastic, thermosetting, or modified resins based on acryl, epoxy, polyurethane, polyether, polyamide, unsaturated polyester, phenol, silicone, or fluorine, a polyvinyl-based resin such as vinyl chloride, vinyl acetate, polyvinyl alcohol, or polyvinyl butyral, a polyester-based resin such as an alkyd resin and or a phthalic acid resin, an amino-based material such as a melamine resin, a melamine formaldehyde resin, an amino alkyd cocondensation resin, a urea resin, or a urea resin, and resin particles of a copolymer, a mixture, and the like of these. Among these, the anionic acrylic resin is obtained by, for example, polymerizing an acryl monomer having an anionic group (anionic group-containing acryl monomer) and optionally another monomer copolymerizable with the anionic group-containing acryl monomer in a solvent. Examples of the anionic group-containing acryl monomer include acryl monomers having one or more selected from the group consisting of a carboxyl group, a sulfonic group, and a phosphonic group. Among these, acryl monomers having a carboxyl group (for example, acrylic acid, methacrylic acid, crotonic acid, ethacrylic acid, propylacrylic acid, isopropylacrylic acid, itaconic acid, and fumaric acid) are preferable, and acrylic acid or methacrylic acid is particularly preferable.

In view of the jetting stability and the stability of liquid containing the pigment (particularly, dispersion stability), the water-insoluble resin particles are preferably self-dispersing resin particles. The self-dispersing resin refers to a water-insoluble polymer which can be in a dispersion state in an aqueous medium by a functional group (particularly, an acidic group or a salt thereof) that the polymer itself has, when the polymer is caused to be in a dispersion state by phase inversion emulsification in the absence of a surfactant.

Herein, the "dispersion state" includes both an emulsion state (emulsion) in which the water-insoluble polymer is dispersed in an aqueous medium in a liquid state and a dispersion state (suspension) in which the water-insoluble polymer is dispersed in an aqueous medium in a solid state in the scope thereof.

In view of making it possible to improve the fixability of ink, it is preferable that the self-dispersing resin be a self-dispersing resin that can be in a dispersion state in which the water-insoluble polymer is dispersed in a solid state.

Examples of the method of preparing the emulsion state or dispersion state (that is, an aqueous dispersion of the self-dispersing resin) of the self-dispersing resin include phase inversion emulsification. Examples of the phase inversion emulsification include a method in which the self-dispersing resin is dissolved or dispersed in a solvent (for example, an aqueous organic solvent) and then put into water as is without addition of a surfactant, stirring and mixing is performed on the resultant in a state where a salt-forming group (for example, an acidic group) of the self-dispersing resin has been neutralized, the solvent is removed, and then an aqueous dispersion in an emulsion state or a dispersion state is obtained.

The stabilized emulsion state or dispersion state of the self-dispersing resin refers to the following. That is, a solution obtained by dissolving 30 g of a water-insoluble polymer in 70 g of an organic solvent (for example, methyl ethyl ketone), a neutralizer that can neutralize 100% a salt-forming group of the water-insoluble polymer (sodium hydroxide if the salt-forming group is anionic, and acetic acid if it is cationic), and 200 g of water are mixed and stirred together (device: a stirring device provided with a stirring blade, rotation frequency 200 rpm, 30 minutes, 25° C.), and then the organic solvent is removed from the mixed liquid. At this time, if the emulsion state or the dispersion state is stably present for at least one week at 25° C. even after the removal of organic solvent, and the occurrence of precipitation is not visually observed, the state is considered to be the stabilized emulsion state or dispersion state of the self-dispersing resin.

The stability of the emulsion state or dispersion state of the self-dispersing resin can be confirmed by an accelerated precipitation test by means of centrifugation. The evaluation for stability that is performed by the accelerated precipitation test by means of centrifugation can be performed by, for example, adjusting a solid content concentration of the aqueous dispersion of the resin particles that is obtained by the above method to 25% by mass, then performing centrifugation for an hour at 12,000 rpm, and measuring the solid content concentration of the supernatant obtained after centrifugation.

As the proportion of the solid content concentration after centrifugation to the solid content concentration before centrifugation increases (as the value of the proportion is getting close to 1), the precipitation of the resin particles caused by centrifugation occurs less. This means that the aqueous dispersion of the resin particles has been stabilized further. When the ink composition uses the aqueous dispersion of the self-dispersing resin, the proportion of the solid content concentration of the dispersion after centrifugation is preferably 0.8 or higher, more preferably 0.9 or higher, and particularly preferably 0.95 or higher.

When the self-dispersing resin is caused to be in a dispersion state, the content of a water-soluble component that indicates water solubility is preferably 10% by mass or less, more preferably 8% by mass or less, and even more preferably 6% by mass or less. If the content of a water-soluble component is 10% by mass or less, swelling of the resin particles or fusion between the resin particles can be effectively suppressed, whereby a further stabilized dispersion state can be maintained. Moreover, the increase in viscosity of the aqueous ink composition can be suppressed, and for example, when the aqueous ink composition is applied to an ink jet method, jetting stability can be more excellent.

Herein, the water-soluble component refers to a compound which is contained in the self-dispersing resin and dissolves in water when the self-dispersing resin is turned into a dispersion state in water. The water-soluble component is a water-soluble compound that is produced as a byproduct or mixed in when the self-dispersing resin is produced.

A main skeleton of the water-insoluble resin is not particularly limited, and examples thereof include a vinyl polymer and a condensed polymer (epoxy resin, polyester, polyurethane, polyamide, cellulose, polyether, polyurea, polyimide, polycarbonate, or the like). Among these, a vinyl polymer is particularly preferable.

Preferable examples of the vinyl polymer and a monomer that forms the vinyl polymer include those described in JP-A No. 2001-181549 and JP-A No. 2002-88294. In addition, it is possible to use a vinyl polymer in which a dissociable group has been introduced to the terminal of the polymer chain by radical polymerization of a vinyl monomer by using a chain-transfer agent or a polymerization initiator having a dissociable group (or a substituent that can be induced to be a dissociable group) or an iniferter, or by ionic polymerization by using a compound having a dissociable group (or a substituent that can be induced to be a dissociable group) in any one of the initiator and terminator.

Preferable examples of the condensed polymer and monomer that forms the condensed polymer include those described in JP-A No. 2001-247787.

In view of more excellent self-dispersibility, it is preferable that the self-dispersing resin particles contain a water-insoluble polymer containing a hydrophilic structural unit and a structural unit derived from an aromatic group-containing monomer or a cyclic aliphatic group-containing monomer.

The "hydrophilic structural unit" is not particularly limited as long as it is derived from a hydrophilic group-containing monomer, and may be derived from one kind of hydrophilic group-containing monomer or two or more kinds of hydrophilic group-containing monomers. The hydrophilic group is not particularly limited, and may be a dissociable group or a nonionic hydrophilic group. In view of accelerating self dispersion and a higher degree of stability of the formed emulsion state and dispersion state, the hydrophilic group is preferably a dissociable group and more preferably an anionic dissociable group. Examples of the dissociable group include a carboxyl group, a phosphoric group, a sulfonic group, and the like. Among these, in view of fixability of the ink composition, a carboxyl group is preferable.

In view of more excellent self-dispersibility and aggregating properties, the hydrophilic group-containing monomer is preferably a dissociable group-containing monomer, and more preferably a dissociable group-containing monomer having a dissociable group and an ethylenically unsaturated bond. Examples of the dissociable group-containing monomer include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxy methyl succinate, and the like.

Specific examples of the unsaturated sulfonic acid monomer include styrene sulfonic acid, 2-acrylamide-2-methylpropane sulfonate, 3-sulfopropyl(meth)acrylate, bis-(3-sulfopropyl)-itaconate, and the like.

Specific examples of the unsaturated phosphoric acid monomer include vinyl sulfonate, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate, and the like.

Among the dissociable group-containing monomers, an unsaturated carboxylic acid monomer is preferable, an acrylic monomer is more preferable, and acrylic acid and methacrylic acid are particularly preferable, in view of more excellent dispersion stability and jetting stability.

In view of improving aggregation speed when the ink composition is brought into contact with a treatment liquid to form an image by using the self-dispersibility and the treatment liquid, the self-dispersing resin particles preferably contain a polymer having a carboxyl group, and more preferably contains a polymer having a carboxyl group and an acid value of 25 mg KOH/g to 100 mg KOH/g. In addition, in view of excellent self-dispersibility, the acid value is more preferably 30 mg KOH/g to 90 mg KOH/g, and particularly preferably 35 mg KOH/g to 65 mg KOH/g. Particularly, if the acid value is 25 mg KOH/g or higher, the stability of self-dispersibility can be more excellent, and if it is 100 mg KOH/g or lower, the aggregation properties are further improved.

The aromatic group-containing monomer is not particularly limited as long as it is a compound containing an aromatic group and a polymerizable group. The aromatic group may be a group derived from aromatic hydrocarbon or a group derived from an aromatic heterocycle. In an embodiment, in view of excellent particle shape stability in an aqueous medium, the aromatic group-containing monomer is preferably an aromatic group derived from aromatic hydrocarbon.

In addition, the polymerizable group may be a condensation-polymerizable group or a addition-polymerizable group. In an embodiment, in view of excellent particle shape stability in an aqueous medium, the polymerizable group is preferably an addition-polymerizable group, and more preferably a group containing an ethylenically unsaturated bond.

The aromatic group-containing monomer is preferably a monomer having an aromatic group derived from aromatic hydrocarbon and an ethylenically unsaturated bond. One kind of the aromatic group-containing monomer may be used alone, or two or more kinds thereof may be used in combination. Examples of the aromatic group-containing monomer include phenoxyethyl (meth)acrylate, benzyl (meth)acrylate, phenyl (meth)acrylate, a styrene-based monomer, and the like. Among these, in view of the balance between hydrophilicity and hydrophobicity of a polymer chain and the fixability of ink, an aromatic group-containing (meth)acrylate monomer is preferable, at least one kind selected from phenoxyethyl (meth)acrylate, benzyl (meth)acrylate, and phenyl (meth)acrylate is more preferable, and phenoxyethyl (meth)acrylate and benzyl (meth)acrylate are even more preferable.

In addition, the "(meth)acrylate" means acrylate or methacrylate.

The cyclic aliphatic group-containing monomer is preferably a monomer having a cyclic aliphatic group derived from cyclic aliphatic hydrocarbon and an ethylenically unsaturated bond, and more preferably a cyclic aliphatic group-containing (meth)acrylate monomer (hereinafter, called "alicyclic (meth)acrylate" in some cases).

The alicyclic (meth)acrylate includes a structural moiety derived from (meth)acrylic acid and a structural moiety derived from an alcohol, and has a structure in which at least one substituted or unsubstituted alicyclic hydrocarbon group (cyclic aliphatic group) is contained in the structural moiety derived from an alcohol. The alicyclic hydrocarbon group may be the structural moiety itself derived from an alcohol, or may bind to the structural moiety derived from an alcohol via a linking group.

The alicyclic hydrocarbon group is not particularly limited as long as it contains a cyclic non-aromatic hydrocarbon group. Examples thereof include a monocyclic hydrocarbon group, a bicyclic hydrocarbon group, and polycyclic hydrocarbon groups having three or more interconnected rings. Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo [5.2.1.02,6]decanyl group, a bicyclo[4.3.0]nonane group, and the like.

The alicyclic hydrocarbon group may be unsubstituted or may further have a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or aryl carbonyl group, a cyano group, and the like. Moreover, the alicyclic hydrocarbon group may or may not further form a condensed ring. In the alicyclic hydrocarbon group, it is preferable that the portion of the alicyclic hydrocarbon group have 5 to 20 carbon atoms, in view of excellent viscosity and/or solubility.

Specific examples of alicyclic (meth)acrylate will be shown below, but the invention is not limited thereto.

Examples of monocyclic (meth)acrylate include cycloalkyl (meth)acrylate in which a cycloalkyl group has 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, cyclodecyl (meth)acrylate, and the like.

Examples of bicyclic (meth)acrylate include isobornyl (meth)acrylate, norbornyl (meth)acrylate, and the like.

Examples of tricyclic (meth)acrylate include adamantyl (meth)acrylate, dicyclopentanyl (meth)acrylate, dicyclopentenyloxyethyl (meth)acrylate, and the like.

One kind of these can be used alone, or two or more kinds thereof can be used by being mixed with each other.

Among these, in view of excellent dispersion stability, fixability, and blocking resistance of the self-dispersing resin particles, the alicyclic hydrocarbon group is preferably at least one kind of bicyclic (meth)acrylate or polycyclic (meth)acrylate having three or more interconnected rings, and more preferably at least one kind selected from isobornyl (meth)acrylate, adamantyl (meth)acrylate, and dicyclopentanyl (meth)acrylate.

The self-dispersing resin is preferably an acrylic resin containing a structural unit derived from a (meth)acrylate monomer, more preferably an acrylic resin containing a structural unit derived from an aromatic group-containing (meth)acrylate monomer or alicyclic (meth)acrylate. Even more preferably, the self-dispersing resin contains a structural unit derived from an aromatic group-containing (meth)acrylate monomer or alicyclic (meth)acrylate, and the content thereof is from 10% by mass to 95% by mass. If the content of the aromatic group-containing (meth)acrylate monomer or alicyclic (meth)acrylate is from 10% by mass to 95% by mass, the stability of the emulsion state or dispersion state can be further improved, and the increase in the viscosity of ink can be inhibited.

In view of excellent stability of the dispersion state, stabilization of the particle shape in an aqueous medium that is realized by the hydrophobic interaction between aromatic rings, and the reduction in the amount of water-soluble component that is realized by hydrophobizing the particles to an appropriate degree, the content of the aromatic group-containing (meth)acrylate monomer or the alicyclic (meth)acrylate is more preferably from 15% by mass to 90% by mass, even more preferably from 15% by mass to 80% by mass, and particularly preferably from 25% by mass to 70% by mass.

The self-dispersing resin can be constituted with, for example, a structural unit derived from an aromatic group-containing monomer or a cyclic aliphatic group-containing monomer (preferably alicyclic (meth)acrylate) and a structural unit derived from a dissociable group-containing monomer. In addition, the self-dispersing resin may or may not further contain other structural units as necessary.

The monomers that form the above other structural units are not particularly limited as long as they are monomers copolymerizable with the aromatic group-containing monomer and the dissociable group-containing monomer. Among these, in view of the flexibility of a polymer skeleton or the ease of controlling a glass transition temperature (Tg), the monomers are preferably alkyl group-containing monomers (for example, alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate).

The molecular weight of the water-insoluble polymer that constitutes the self-dispersing resin particles is preferably from 3,000 to 200,000, more preferably from 5,000 to 150,000, and even more preferably from 10,000 to 100,000, in terms of weight average molecular weight. If the weight average molecular weight is 3,000 or more, it is possible to effectively suppress the amount of the water-soluble component. Moreover, if the weight average molecular weight is 200,000 or less, it is possible to improve the self-dispersion stability.

The weight average molecular weight is measured by Gel Permeation Chromatography (GPC). The detail of GPC is as described above.

In view of regulating hydrophilicity and hydrophobicity of the polymer, the water-insoluble polymer that constitutes the self-dispersing resin particles preferably contains the structural unit derived from an aromatic group-containing (meth)acrylate monomer (preferably a structural unit derived from phenoxyethyl (meth)acrylate and/or a structural unit derived from benzyl (meth)acrylate) or a cyclic aliphatic group-containing monomer (preferably alicyclic (meth)acrylate), in an amount of from 15% by mass to 80% by mass based on the total mass of the self-dispersing resin particles in terms of a copolymerization ratio.

In addition, in view of regulating hydrophilicity and hydrophobicity of the polymer, the water-insoluble polymer preferably contains a structural unit derived from an aromatic group-containing (meth)acrylate monomer or alicyclic (meth)acrylate in an amount of from 15% by mass to 80% by mass in terms of a copolymerization ratio, a structural unit derived from a carboxyl group-containing monomer, and a structural unit derived from an alkyl group-containing monomer (preferably a structural unit derived from an alkyl ester of (meth)acrylic acid), and more preferably contains a structural unit derived from phenoxyethyl (meth)acrylate and/or a structural unit derived from benzyl (meth)acrylate in an amount of 15% by mass to 80% by mass in terms of a copolymerization ratio, a structural unit derived from a carboxyl group-containing monomer, and a structural unit derived from an alkyl group-containing monomer (preferably a structural unit derived from an alkyl ester of (meth)acrylic acid that has 1 to 4 carbon atoms).

Specific examples of the water-insoluble resin that forms resin particles will be described below, but the invention is not limited thereto. In addition, in the parenthesis, a mass ratio between copolymerization components is described.

Phenoxyethyl acrylate/methyl methacrylate/acrylic acid copolymer (50/45/5)

Phenoxyethyl acrylate/benzyl methacrylate/isobutyl methacrylate/methacrylic acid copolymer (30/35/29/6)

Phenoxyethyl methacrylate/isobutyl methacrylate/methacrylic acid copolymer (50/44/6)

Phenoxyethyl acrylate/methyl methacrylate/ethyl acrylate/acrylic acid copolymer (30/55/10/5)

Benzyl methacrylate/isobutyl methacrylate/methacrylic acid copolymer (35/59/6)

Styrene/phenoxyethyl acrylate/methyl methacrylate/acrylic acid copolymer (10/50/35/5)

Benzyl acrylate/methyl methacrylate/acrylic acid copolymer (55/40/5)

Phenoxyethyl methacrylate/benzyl acrylate/methacrylic acid copolymer (45/47/8)

Styrene/phenoxyethyl acrylate/butyl methacrylate/acrylic acid copolymer (5/48/40/7)

Benzyl methacrylate/isobutyl methacrylate/cyclohexyl methacrylate/methacrylic acid copolymer (35/30/30/5)

Phenoxyethyl acrylate/methyl methacrylate/butyl acrylate/methacrylic acid copolymer (12/50/30/8)

Benzyl acrylate/isobutyl methacrylate/acrylic acid copolymer (93/2/5)

Methyl methacrylate/methoxyethyl acrylate/benzyl methacrylate/acrylic acid copolymer (44/15/35/6)

Styrene/butyl acrylate/acrylic acid copolymer (62/35/3)

Methyl methacrylate/phenoxyethyl acrylate/acrylic acid copolymer (45/51/4)

Methyl methacrylate/isobornyl methacrylate/methacrylic acid copolymer (20/72/8)

Methyl methacrylate/isobornyl methacrylate/methacrylic acid copolymer (40/52/8)

Methyl methacrylate/isobornyl methacrylate/dicyclopentanyl methacrylate/methacrylic acid copolymer (20/62/10/8)

Methyl methacrylate/dicyclopentanyl methacrylate/methacrylic acid copolymer (20/72/8)

It is preferable that the water-insoluble resin which forms the resin particle be prepared as a polymer dispersion (dispersion) containing a polymer synthesized in an organic solvent and water as a continuous phase, in which the polymer has anionic groups (for example, carboxyl groups), and a part or all of anionic groups (for example, carboxyl groups) of the polymer are neutralized. That is, the water-insoluble resin particles are preferably produced by a step of synthesizing a polymer in an organic solvent, and a dispersing step for obtaining an aqueous dispersion in which at least a part of the anionic groups (for example, carboxyl groups) of the polymer has been neutralized. The dispersion step preferably includes the following steps (1) and (2).

Step (1): a step of stirring a mixture containing a polymer (water-insoluble polymer), an organic solvent, a neutralizer, and an aqueous medium.

Step (2): a step of removing the organic solvent from the mixture.

The step (1) is preferably the treatment for obtaining a dispersion by dissolving a polymer (water-insoluble polymer) in an organic solvent, and then slowly adding a neutralizer and an aqueous medium thereto, followed by mixing and stirring. A self-dispersing resin particle having a particle size that further improves storage stability can be obtained by adding a neutralizer and an aqueous medium to the solution of water-insoluble polymer dissolved in an organic solvent in this manner without requiring a strong shear force. The stirring method of the mixture is not particularly limited, and a generally used mixing and stirring device and optionally a dispersing machine such as an ultrasonic dispersing machine or a high-pressure homogenizer can be used as necessary. Moreover, in the step (2), the organic solvent is evaporated by a common method such as distillation under reduced pressure from the dispersion obtained by the step (1) such that the phase inversion to an aqueous phase is caused, whereby an aqueous dispersion of the self-dispersing resin particles can be obtained. The organic solvent in the obtained aqueous dispersion has been practically removed, and the amount of the organic solvent is preferably 0.2% by mass or less, and more preferably 0.1% by mass or less.

Preferable examples of the organic solvent include an alcohol solvent, a ketone solvent, and an ether solvent. Examples of the alcohol solvent include isopropyl alcohol, n-butanol, t-butanol, ethanol, and the like. Examples of the ketone-based solvent include acetone, methyl ethyl ketone, diethyl ketone, methyl isobutyl ketone, and the like. Examples of the ether solvent include dibutyl ether, dioxane, and the like. Among these solvents, a ketone solvent such as methyl ethyl ketone and an alcohol-based solvent such as isopropyl alcohol are preferable. Moreover, for the purpose of mitigating polarity change caused when phase inversion from an oil phase to an aqueous phase occurs, it is also preferable to concurrently use isopropyl alcohol with methyl ethyl ketone. If the solvents are used concurrently, it is possible to obtain a self-dispersing resin particle with a small particle size having a high degree of dispersion stability without causing aggregation and precipitation or fusing between particles.

The neutralizer is used for creating an emulsion or dispersion state in which a part or all of dissociable groups are neutralized, and the polymer is stabilized in water. When the water-insoluble resin particle have an anionic dissociable group (for example, a carboxyl group) as a dissociable group, examples of the neutralizer used include basic compounds such as an organic amine compound, ammonia, and hydroxide of an alkali metal. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyl diethanolamine, N-ethyl diethanolamine, monoisopropanolamine, diisopropanolamine, triisopropanolamine, and the like. Examples of the hydroxide of an alkali metal include lithium hydroxide, sodium hydroxide, potassium hydroxide, and the like. Among these, in view of dispersion stability of the self-dispersing resin particle in water, sodium hydroxide, potassium hydroxide, triethylamine, and triethanolamine are preferable.

The average particle size of the self-dispersing resin particle is preferably in a range of 10 nm to 400 nm, more preferably in a range of from 10 nm to 200 nm, and even more preferably in a range of from 10 nm to 100 nm, in terms of a volume average particle size. If the volume average particle size is 10 nm or larger, production suitability is improved, and if it is 1 μm or less, storage stability is improved.

The particle size distribution of the self-dispersing resin particle is not particularly limited. The particles may have a wide particle size distribution or a particle size distribution of monodispersion. Moreover, one kind of water-insoluble particles may be used alone, or two or more kinds thereof may be used by being mixed with each other.

The average particle size and particle size distribution of the self-dispersing resin particle are obtained by measuring the volume average particle size by using a nanotrac particle size distribution analyzer UPA-EX150 (trade name, manufactured by NIKKISO CO., LTD.) by means of a dynamic light scattering method.

In view of the storage stability of the ink composition, the glass transition temperature (Tg) of the water-insoluble resin is preferably 30° C. or higher, more preferably 40° C. or higher, and even more preferably 50° C. or higher.

The content of the resin particle in the ink composition is preferably from 0.5% by mass to 10% by mass, and more preferably from 1% by mass to 9% by mass, based on the total mass of the ink composition. If the content of the resin particle is 0.5% by mass or more, the rubbing resistance of image can be improved. Moreover, if the content of the resin particle is 10% by mass or less, this can be advantageous in terms of the long-term jetting stability of the ink composition.

(Urea or Derivative Thereof)

The ink composition preferably contains urea or a derivative of urea. Urea and a derivative of urea can improve cleaning properties obtained by wiping or the like performed when the ink composition containing a pigment is stuck. Particularly, they can ameliorate wipe-out properties when the ink containing the resin particle are dried and solidified.

When the ink is exposed to a high temperature, pH of the liquid increases in some cases due to decomposition of urea. In this case, if the ink of the related art is used, the member inside the jetting head is corroded due to etching, and the ink is further stuck and deposited, whereby bent jetting or jetting failure tends to easily occur. The ink of the invention can exert an effect of suppressing the bent jetting or jetting failure even when pH changes as above.

Examples of the derivative of urea include a compound obtained by substituting hydrogen on nitrogen of urea with an alkyl group or alkanol, thiourea, a compound obtained by substituting hydrogen on nitrogen of thiourea with an alkyl group or alkanol, and the like. Specific examples thereof include N,N-dimethyl urea, thiourea, ethylene urea, hydroxyethyl urea, hydroxybutyl urea, ethylene thiourea, diethyl thiourea, and the like.

The content of urea or a derivative thereof in the ink composition is preferably from 1.0% by mass to 20.0% by mass, and more preferably from 2.0% by mass to 15.0% by mass, based on the total mass of the ink composition.

If the content of urea and a derivative thereof is 1.0% by mass or more, the ink is more easily wiped out when it is stuck, whereby maintainability can be improved. Moreover, if the content of urea and a derivative thereof is 20.0% by mass or less, this can be advantageous in terms of suppressing tackiness and blocking resulting from moisture absorption of urea and a derivative thereof contained in an image.

(Water)

The ink composition can contain water. Though not particularly limited, the content of water is preferably in a range of from 10% by mass to 99% by mass, more preferably 30% by mass to 80% by mass, and even more preferably from 50% by mass to 70% by mass.

(Other Components)

The ink composition can optionally contain other components such as additives, in addition to the above components. Examples of other components include known additives such as an anti-fading agent, an emulsion stabilizer, a penetration promoter, an ultraviolet absorber, a preservative, a mildewproofing agent, a pH adjuster, a surface tension adjuster, a defoamer, a viscosity modifier, a dispersant, a dispersion stabilizer, an anticorrosive agent, and a chelating agent. Each of these additives may be directly added after the ink composition is prepared, or may be added during the preparation process of the ink composition. Specific examples thereof include other components and the like described in paragraphs [0153] to [0162] in JP-A No. 2007-100071.

Examples of the surface tension adjuster include an nonionic surfactant, a cationic surfactant, an anionic surfactant, a betaine surfactant, and the like. In order to excellently jet the ink composition by an ink jet method, the content of the surface tension adjuster is preferably an amount that adjusts the surface tension of the ink composition to from 20 mN/m to 60 mN/m, more preferably an amount that adjusts the surface tension to from 20 mN/m to 45 mN/m, and even more preferably an amount that adjusts the surface tension to from 25 mN/m to 40 mN/m. The surface tension can be measured at 25° C. by using, for example, a plate method.

Specific and preferable examples of the surfactant include anionic surfactants based on hydrocarbon, such as a fatty acid salt, an alkyl sulfuric acid ester salt, an alkylbenzene sulfonic acid salt, an alkylnaphthalene sulfonic acid salt, a dialkyl sulfosuccinic acid salt, an alkyl phosphoric acid ester salt, a naphthalene sulfonate formalin condensate, and a polyoxyethylene alkyl sulfuric acid ester salt, and nonionic surfactants such as polyoxyethylene alkylether, polyoxyethylene alkylallyl ether, a polyoxyethylene fatty acid ester, a sorbitan fatty acid ester, a polyoxyethylene sorbitan fatty acid ester, polyoxyethylene alkylamine, a glycerin fatty acid ester, and an oxyethylene oxypropylene block copolymer. Moreover, SURFYNOL (R) (manufactured by AirProducts & ChemicaLs) as an acetylene-based polyoxyethylene oxide surfactant or OLFINE E1010 (trade name, manufactured by Nissin Chemical Industry Co., Ltd.) are also preferably used. Furthermore, an amine oxide-type amphoteric surfactant such as N,N-dimethyl-N-alkyl amine oxide and the like are also preferable. In addition, those exemplified as surfactants in JP-A No. 59-157636, pp. 37 to 38 and Research Disclosure No. 308119 (1989) can also be used. Morever, if the fluorocarbon (alkyl fluoride) surfactant, silicone-based surfactant, and the like disclosed in JP-A No. 2003-322926, JP-A No. 2004-325707, and JP-A No. 2004-309806 are used, rubbing resistance can be more improved.

These surface tension adjusters can also be used as a defoamer, and a fluorine-based compound, a silicone-based compound, and a chelating agent represented by EDTA, and the like can also be used.

Viscosity

When the ink is provided by an ink jet method, the viscosity of the ink composition is preferably in a range of from 1 mPa·s to 30 mPa·s, more preferably in a range of from 1 mPa·s to 20 mPa·s, even more preferably in a range of from 2 mPa·s to 15 mPa·s, and particularly preferably in a range of from 2 mPa·s to 10 mPa·s, in view of improving jetting stability and aggregation speed. The viscosity of the ink composition can be measured at 20° C. by using, for example, Brookfield viscometer.

pH

In view of improving ink stability and aggregation speed, pH of the ink composition is preferably from 7.5 to 10.0, and more preferably from 8.0 to 9.5. In addition, pH of the ink composition is measured at 25° C. by using a generally used pH meter (for example, trade name HM-30R, manufactured by DKK-TOA CORPORATION).

Moreover, pH of the ink composition can be appropriately adjusted by using an acidic or basic compound. As the acidic or basic compound, generally used compounds can be used without particular limitation.

In one preferable embodiment of the image forming method of the invention, image formation is performed by using an ink set containing the ink composition (and optionally ink compositions of other colors) and a treatment liquid that can form an aggregate when in contact with the ink composition. The ink set can be used in a form of an ink cartridge that contains the ink composition or the treatment liquid integrally or individually, and this usage mode is preferable in terms of the convenience in handling. The ink cartridge containing the ink set is known in the related technical field, and the ink cartridge containing the ink composition can be obtained by appropriately using a known method.

<Ink Set>

The ink set of the invention includes at least the ink composition of the invention described above, and a treatment liquid containing an aggregation component which forms an aggregate when in contact with the ink composition. Since the ink set uses the ink composition, an image formed by using the ink set can have excellent rubbing resistance. Moreover, when images are formed while the jetting of ink and the suspension of jetting are being repeated, bent jetting and jetting failure of the ink can be suppressed, occurrence of image failures such as color missing can be inhibited, and high-definition images can be stably formed over a long period of time. In addition, since the ink is not easily stuck, and the stuck ink does not easily grow as an adherend, maintainability can also be excellent.

The treatment liquid is an aqueous composition that can form an aggregate when in contact with the ink composition. Specifically, the treatment liquid contains at least an aggregation component which can form an aggregate by aggregating dispersed particles such as coloring particles (pigment and the like) in the ink composition when being mixed with the ink composition, and can contain other components as necessary. If the treatment liquid is used together with the ink composition, ink jet recording speed can be increased, and images with a high density and high resolution can be obtained even if the images are recorded at a high speed.

The treatment liquid contains at least one aggregation component that can form an aggregate when in contact with the ink composition. If the treatment liquid is mixed with the ink composition jetted by an ink jet method, aggregation of the pigment and the like stably dispersed in the ink composition is accelerated.

Examples of the treatment liquid include a liquid composition that can generate an aggregate by changing pH of the ink composition. At this time, in view of aggregation speed of the ink composition, pH (25° C.) of the treatment liquid is preferably from 1 to 6, more preferably from 1.2 to 5, and even more preferably from 1.5 to 4. In this case, pH (25° C.) of the ink composition used for providing ink is preferably from 7.5 to 9.5 (more preferably from 8.0 to 9.0).

In the above range, in view of image density, resolution, and increasing ink jet recording speed, a case where pH (25° C.) of the ink composition is 7.5 or higher and pH (25° C.) of the treatment liquid is 3 to 5 is preferable.

One kind of the aggregation component can be used alone, or two or more kinds thereof can be used by being mixed with each other.

The treatment liquid can use at least one acidic compound as the aggregation component. Examples of the acidic compound include compounds having a phosphoric group, sulfonic group, phosphinic group, a sulfuric group, a sulfonic group, a sulfinic group, or a carboxyl group, and a salt of these (for example, polyvalent metal salts). Among these, in view of improving aggregation speed of the ink composition, compounds having a phosphoric group or a carboxyl group are more preferable, and compounds having a carboxyl group are even more preferable.

It is preferable that the compounds having a carboxyl group be selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, and salts (for example, polyvalent metal salts) of these. One kind of these compounds may be used, or two or more kinds thereof may be concurrently used.

The treatment liquid of the invention can contain an aqueous solvent (for example, water) in addition to the above acidic compound.

In view of improving aggregation speed, the content of the acidic compound in the treatment liquid is preferably from 5% by mass to 95% by mass and more preferably from 10% by mass to 80% by mass, based on the total mass of the treatment liquid.

A preferable example of the treatment liquid that improves high-speed aggregation properties include a treatment liquid to which a polyvalent metal salt or polyallyl amine has been added. Examples of the polyvalent metal salt include alkaline earth metals (for example, magnesium and calcium) belonging to group 2 on the periodic table, transition metals (for example, lanthanum) belonging to group 3 on the periodic table, metals (for example, aluminum) belonging to group 13 on the periodic table, salts of lanthanides (for example, neodymium), polyallyl amine, polyallyl amine derivatives, and the like. As metal salts, carboxylic acid salt (formic acid, acetic acid, benzoic acid salt, and the like), nitric acid salt, chloride, and thiocyanic acid salt are preferable. Among these, a calcium salt or a magnesium salt of carboxylic acid (formic acid, acetic acid, benzoic acid salt, or the like), a calcium salt or a magnesium salt of nitric acid, calcium chloride, magnesium chloride, and a calcium salt or a magnesium salt of thiocyanic acid are preferable.

The content of the metal salt in the treatment liquid is preferably from 1% by mass to 10% by mass, more preferably from 1.5% by mass to 7% by mass, and even more preferably in a range of from 2% by mass to 6% by mass.

In view of improving the aggregation speed of the ink composition, the viscosity of the treatment liquid is preferably in a range of from 1 mPa·s to 30 mPa·s, more preferably in a range of from 1 mPa·s to 20 mPa·s, even more preferably in a range of from 2 mPa·s to 15 mPa·s, and particularly preferably in a range of from 2 mPa·s to 10 mPa·s. In addition, the viscosity is measured by using VISCOMETER TV-22 (trade name, manufactured by TOKI SANGYO CO. LTD) under a condition of 20° C.

Moreover, in view of the aggregation speed of the ink composition, the surface tension of the treatment liquid is preferably in a range of from 20 mN/m to 60 mN/m, more preferably in a range of from 20 mN/m to 45 mN/m, and even more preferably in a range of from 25 mN/m to 40 mN/m. In addition, the surface tension is measured by using Automatic Surface Tensiometer CBVP-Z (trade name, manufactured by Kyowa Interface Science Co., LTD.) under a condition of 25° C.

<Image Forming Method>

The image forming method of the invention includes at least jetting the ink composition or an ink composition contained in the ink set to a recording medium from an jetting head, which has plural nozzle holes for jetting liquid droplets and a silicon atom-containing film on an internal surface of the nozzle holes, by an ink jet method. In a preferable embodiment, the image forming method includes the above ink-application step and a step of applying a treatment liquid containing an aggregation component that forms an aggregate when in contact with the ink composition provided by the ink-application step to a recording medium. In addition, the image forming method may include the ink-application step as a final step, or alternatively, the image forming method may further include another step such as heat-fixing for heating an ink image formed by ink-application step so as to fix the image to a recording medium if necessary.

Herein, the scope of the "step" includes not only an independent step but also a step that is not clearly differentiated from other steps, as long as a desired action of the step is accomplished.

By the use of the ink composition, the image formed by the image forming method can obtain excellent rubbing resistance. Moreover, when images are formed while the jetting of the ink liquid and the suspension of jetting are being repeated, bent jetting and jetting failure of the ink can be suppressed, image failures such as color missing can be inhibited, and high-definition images can be stably formed over a long period of time. In addition, since the ink is not easily stuck, and the stuck ink does not easily grow as an adherend, maintainability can become excellent.

—Ink-Application Step—

In the ink-application step, the ink composition or an ink composition contained in the ink set is jetted by an ink jet method to a recording medium from an jetting head, which has plural nozzle holes for jetting liquid droplets and includes a silicon atom-containing film (for example, silicon or an oxide film of silicon (example: $SiO_2$ film)) on an internal surface of the nozzle holes, thereby forming an image.

The ink jet method is not particularly limited and may be any of known methods such as a charge control method in which the ink is jetted by utilizing an electrostatic attraction force, a piezoelectric ink jet method in which the ink is jetted by utilizing a piezoelectric element that causes mechanical strain by the application of voltage, an acoustic ink jet method in which an electric signal is converted into an acoustic beam and emitted to the ink such that the ink is jetted by utilizing a radiation pressure, and a thermal ink jet (bubble jet (registered trademark)) method which utilizes a pressure caused by bubbles formed by heating the ink.

Moreover, the ink jet method includes a method in which a large number of low-concentration ink called a photo ink is shot in a small volume, a method of improving image quality by using plural inks having the practically same color and different concentration, or a method of using a colorless transparent ink.

As the ink jet method, an embodiment of jetting the ink by a piezoelectric ink jet method is suitable. If the ink composition or the ink set containing the same is combined with the piezoelectric ink jet method, the continuous jetting property and jetting stability of the ink can be further improved.

In the piezoelectric ink jet method, the form of strain caused by the piezoelectric element may be any of a flexure mode, a longitudinal mode, and a shear mode. The constitution of the piezoelectric element and the structure of a piezoelectric head are not particularly limited, and known technique can be employed.

The ink nozzle and the like used for performing recording by the ink jet method are not particularly limited and can be appropriately selected according to the purpose.

In addition, as the ink jet method, a shuttle method in which a short serial head is used to perform recording while being allowed to perform scanning in the width direction of a recording medium, and a line method using a line head in which recording elements are arranged corresponding to the whole region of one side of a recording medium are applicable. In the line method, by causing a recording medium to be scanned in a direction orthogonal to the arrangement direction of recording elements, an image can be recorded on the entire surface of the recording medium. Moreover, in this method, only the recording medium moves, and accordingly, recording can be performed at a higher speed compared to the shuttle method.

The amount of ink droplets jetted from the ink jet head is preferably from 0.2 µl to 10 µl (picoliter) and more preferably from 0.4 µl to 5 µl. In addition, the maximum total amount of the ink jetted during image recording is preferably in a range of from 10 ml/m² to 36 ml/m², and more preferably from 15 ml/m² to 30 ml/m².

—Treatment Liquid-Application Step—

In the treatment liquid-application step, the treatment liquid containing an aggregation component that can form an aggregate when in contact with the ink composition is applied onto a recording medium.

The application of treatment liquid can be performed by employing a known method such as coating, an ink jet method, and dipping. The coating can be performed by known coating methods using a bar coater, an extrusion die coater, an air doctor coater, a blade coater, a rod coater, a knife coater, a squeeze coater, and a reverse roll coater. The detail of the ink jet method is the same as in the ink-application step described below.

The treatment liquid may be provided before or after the ink-application step described below. In the invention, an embodiment in which the ink is provided after the treatment liquid-application step is preferable. That is, an embodiment is preferable in which the treatment liquid for aggregating a coloring material (preferably a pigment) in the ink is provided in advance before the ink is provided onto a recording medium, and the ink is provided so as to contact with the treatment liquid provided onto the recording medium, thereby forming an image. In this manner, the image can be formed at a high speed, and an image with a high density and high resolution can be obtained even at the high speed.

The application amount of the treatment liquid is not particularly limited as long as the ink can be aggregated. In an embodiment, the amount can be set such that the amount of the aggregation component provided becomes 0.1 g/m² or more. In the above range, the amount is set such that the amount of the aggregation components provided preferably becomes from 0.1 g/m² to 1.0 g/m², and more preferably becomes from 0.2 g/m² to 0.8 g/m². If the amount of the aggregation component provided is 0.1 g/m² or more, the aggregation reaction can proceeds excellently, and if it is 1.0 g/m² or less, it is possible to inhibit the glossiness from being excessively heightened.

Moreover, after the treatment liquid is applied onto a recording medium after the ink-application step following the treatment liquid-application step, it is preferable to dry the treatment liquid on the recording medium by heating, before the ink is further applied onto the recording medium. By heat-drying the treatment liquid in advance before the ink-application step, coloring properties of the ink, such as suppression of bleeding, becomes excellent, and a visible image having excellent color density and color can be recorded.

The heat-drying can be performed by using known heating means such as a heater, air-sending means that sends air, such as a drier, or means as a combination of these. Examples of the heating method include a method of applying heat from the side opposite to the recording medium surface onto which the treatment liquid has been provided, a method of applying warm or hot air to the recording medium surface onto which the treatment liquid has been provided, a heating method using an infrared heater, and the like. The heating may be performed by using one of these methods or a combination of plural methods.

—Heat-Fixing Step—

After the ink-application step, it is preferable to further fix the ink on the recording medium by heating. In the heat-fixing step, the image recorded by the provision of the treatment liquid and ink is fixed to the recording medium by heating. If the heat-fixing treatment is performed, the image is fixed onto the recording medium, whereby the rubbing resistance of the image can be further improved. Accordingly, it is preferable that the image forming method include the heat-fixing step.

It is preferable that heating be performed at a temperature equal to higher than a Minimum Film-forming Temperature (MFT) of the resin particles in the image. If heating is performed at a temperature equal to or higher than MFT, the particles are turned into a film, whereby the image can be strengthened.

When heating and pressurizing is performed together, in view of smoothing the surface, a pressure at the time of pressurizing is preferably in a range of from 0.1 MPa to 3.0

MPa, more preferably in a range of from 0.1 MPa to 1.0 MPa, and even more preferably in a range of from 0.1 MPa to 0.5 MPa.

The heating method is not particularly limited, and preferable examples thereof include a method of performing heating by using a heat generator such as a nichrome wire heater, a method of supplying warm or hot air, a method of performing heating by using a halogen lamp, an infrared lamp, and the like, and a method of performing drying in a non-contact manner. Moreover, the heating and pressurizing method is not particularly limited, and preferable examples thereof include methods of performing heat-fixing in a contact manner, such as a method of pressing a hot plate on the image-formed surface of a recording medium and a method of passing a pair of rollers by using a heating and pressurizing device that includes a pair of heating and pressurizing rollers, a pair of heating and pressurizing belts, or a heating and pressurizing belt disposed at the side of the image-recorded surface of a recording medium and a holding roller disposed at the side opposite to the belt.

When heating and pressurizing is performed, the nip is preferably from 1 msec to 10 sec, more preferably from 2 msec to 1 sec, and even more preferably from 4 msec to 100 msec. Moreover, a nip width is preferably from 0.1 mm to 100 mm, more preferably from 0.5 mm to 50 mm, and even more preferably from 1 mm to 10 mm.

The heating and pressurizing roller may be a metal roller made of a metal or a roller in which a covering layer formed of an elastic substance and optionally a surface layer (which is also called a "releasing layer") are provided around a metallic core bar. The core bar of the latter can be constituted with a cylindrical substance made of iron, aluminum, stainless steel (SUS), and the like, and it is preferable that at least a portion of the surface of the core bar be covered with the covering layer. It is particularly preferable that the covering layer be formed of a silicone resin or a fluororesin having releasing properties. In addition, it is preferable that a heat generator be built in the inside of one core bar of the heating and pressurizing rollers. By passing a recording medium between the rollers, the heating treatment and pressurizing treatment may be performed at the same time. Alternatively, if necessary, heating may be performed by causing a recording medium to be pinched between two heating rollers. As the heat generator, a halogen lamp heater, a ceramic heater, a nichrome wire, and the like are preferable.

As the substrate of the belt that constitutes the heating and pressurizing belt used in the heating and pressurizing device, a seamless nickel alloy tube is preferable, and a thickness of the substrate is preferably from 10 μm to 100 μm. Moreover, as the material of the belt substrate, aluminum, iron, polyethylene, and the like can be used in addition to nickel. When a silicone resin or a fluororesin is used, a thickness of the layer formed of these resins is preferably from 1 μm to 50 μm and more preferably from 10 μm to 30 μm.

In order to realize the above pressure (nip pressure), for example, an elastic member such as a spring having tension may be selected and installed in the both ends of the rollers such as the heating and pressurizing roller in consideration of the nip gap, such that a desired nip pressure is obtained.

When the heating and pressurizing roller or heating and pressurizing belt is used, the transport speed of a recording medium is preferably from 200 mm/sec to 700 mm/sec, more preferably from 300 mm/sec to 650 mm/sec, and even more preferably from 400 mm/sec to 600 mm/sec.

—Recording Medium—

In the image forming method, the recording medium for forming an image is not particularly limited, and so-called coated paper used for general offset printing or the like, dedicated paper for an ink jet, and the like can be used.

The coated paper refers to the paper that is obtained by providing a coating layer onto the surface of high-quality paper, neutral paper, or the like which is mainly composed of cellulose and generally not subjected to surface treatment, by means of coating the surface with a coating material. As the coated paper, commercially available ones can be used. Specific examples thereof include high-quality paper (A) such as "OK PRINCE HIGH QUALITY (trade name)" manufactured by Oji Paper Co., Ltd., "SHIRAOI (trade name)" manufactured by NIPPON PAPER INDUSTRIES CO., LTD, and "NEW NPI HIGH QUALITY (trade name)" manufactured by NIPPON PAPER INDUSTRIES CO., LTD, lightly coated paper such as "OK EVERLIGHT COAT (trade name)" manufactured by Oji Paper Co., Ltd. and "AURORA S (trade name)" manufactured by NIPPON PAPER INDUSTRIES CO., LTD., lightweight coated paper (A3) such as "OK COAT L (trade name)" manufactured by Oji Paper Co., Ltd. and "AURORA L (trade name)" manufactured by NIPPON PAPER INDUSTRIES CO., LTD., coated paper (A2, B2) such as "OK TOPCOAT+(trade name)" manufactured by Oji Paper Co., Ltd. and "AUAORA COAT (trade name)" manufactured by NIPPON PAPER INDUSTRIES CO., LTD., art paper (A1) such as "OK KANETO+(trade name)" manufactured by Oji Paper Co., Ltd. and "TOKUBISHI ART (trade name)" manufactured by MITSUIBISHI PAPER MILLS, LIMITED, and the like.

The coated paper is a material which slowly absorbs ink. However, if the image forming method described above is used, even when such a material is used, the effect that makes it possible to perform high-speed recording of the image which has excellent rubbing resistance and is inhibited from causing image transfer (color transfer) between recording media can be obtained. In this respect, the coated paper is preferable.

EXAMPLE

Hereinafter, the invention will be described in more detail based on examples, but the invention is not limited to the following examples, within a range that does not exceeds the gist of the invention. In addition, unless otherwise specified, "part(s)" is based on mass.

Example 1

<Preparation of Ink>

—Synthesis of Water-Insoluble Polymer 1—

88 g of methyl ethyl ketone was put in a 1,000 ml three-neck flask including a stirrer and a cooling tube and heated at 72° C. in a nitrogen atmosphere. A solution obtained by dissolving 0.85 g of 2,2'-azobisisobutyrate, 60 g of benzyl methacrylate, 10 g of methacrylic acid, and 30 g of methyl methacrylate in 50 g of methyl ethyl ketone was added dropwise to the resultant over 3 hours. After the dropwise addition ends, the resultant was further reacted for 1 hour. Thereafter, a solution obtained by dissolving 0.40 g of dimethyl 2,2'-azobisisobutyrate in 2 g of methyl ethyl ketone was added thereto, and the temperature thereof was increased to 80° C. to perform heating for 4 hours. The obtained reaction solution was reprecipitated twice in hexane in an amount greatly larger than that of the solution, and the precipitated resin was dried, thereby obtaining 95 g of a water-insoluble polymer 1.

The composition of the obtained water-insoluble polymer was confirmed by ¹H-NMR. The weight average molecular weight (Mw) thereof measured by GPC was 42,000. The acid value of the polymer measured by the method described in JIS standards (JIS K0070: 1992) was 65.8 mg KOH/g.

—Preparation of Resin-Coated Pigment Dispersion—
(Preparation of Resin-Coated Cyan Pigment Dispersion A)

The components in the following composition was mixed with each other and dispersed for 3 to 6 hours with a beads mill using zirconia beads having a particle size of 0.1 mm. Subsequently, methyl ethyl ketone was removed from the obtained dispersion at 55° C. under reduced pressure, and a portion of water was removed, thereby preparing a resin-coated cyan pigment dispersion A having a cyan pigment concentration of 15% by mass.

<Composition of Resin-Coated Cyan Pigment Dispersion A>

| | |
|---|---|
| C.I. Pigment Blue 15:3 pigment powder (trade name: phthalocyanine blue A220, manufactured by Dainichiseika Color & Chemicals Mfg. Co., Ltd.) | 10.0 parts |
| The water-insoluble polymer 1 (water-insoluble resin) | 4.0 parts |
| Methyl ethyl ketone (organic solvent) | 30.5 parts |
| 1 mol/l NaOH solution (neutralizer) | 5.6 parts |
| Deionized water | 98.7 parts |

(Preparation of Resin-Coated Magenta Pigment Dispersion B)

A resin-coated magenta pigment dispersion B having a magenta pigment concentration of 15% by mass was prepared in the same manner as in the preparation of the resin-coated cyan pigment dispersion A, except that the composition was changed to the following composition in the preparation of the resin-coated cyan pigment dispersion A.

<Composition of Resin-Coated Magenta Pigment Dispersion B>

| | |
|---|---|
| C.I. Pigment Red 122 pigment powder (trade name: CromophthalJet Magenta DMQ, manufactured by BASF Japan) | 10.0 parts |
| The water-insoluble polymer 1 (water-insoluble resin) | 3.0 parts |
| Methyl ethyl ketone (organic solvent) | 30.5 parts |
| 1 mol/l NaOH solution (neutralizer) | 4.2 parts |
| Deionized water | 102.3 parts |

(Preparation of Resin-Coated Yellow Pigment Dispersion C)

A resin-coated yellow pigment dispersion C having a yellow pigment concentration of 15% by mass was prepared in the same manner as in the preparation of the resin-coated cyan pigment dispersion A, except that the composition was changed to the following composition in the preparation of the resin-coated cyan pigment dispersion A.

<Composition of Resin-Coated Yellow Pigment Dispersion C>

| | |
|---|---|
| C.I. Pigment Yellow 74 pigment powder (trade name: Hansa Brilliant Yellow 5GX03, manufactured by Clariant) | 10.0 parts |
| The water-insoluble polymer 1 (water-insoluble resin) | 4.3 parts |
| Methyl ethyl ketone (organic solvent) | 30.5 parts |
| 1 mol/l NaOH solution (neutralizer) | 6.0 parts |
| Deionized water | 99.2 parts |

—Preparation of Self-Dispersing Polymer—

540.0 g of methyl ethyl ketone was put in a 2 L three-neck flask including a mechanical stirrer, a thermometer, a reflux cooling tube, and a nitrogen gas-introducing tube, and the temperature thereof was increased to 75° C. While the internal pressure of the reaction container was being kept at 75° C., a mixed solution including 108 g of methyl methacrylate, 388.8 g of isobornyl methacrylate, 43.2 g of methacrylic acid, 108 g of methyl ethyl ketone, and 2.1 g of "V-601" (trade name, manufactured by Wako Pure Chemical Industries, Ltd.) was added dropwise thereto such that the dropwise addition was completed in 2 hours. After the dropwise addition ended, a solution including 1.15 g of "V-601" (described above) and 15.0 g of methyl ethyl ketone was added thereto, followed by stirring for 2 hours at 75° C. In addition, a solution including 0.54 g of "V-601" (described above) and 15.0 g of methyl ethyl ketone was added thereto, followed by stirring for 2 hours at 75° C. Thereafter, the temperature thereof was increased to 85° C. to continue stirring for 2 more hours, thereby obtaining a resin solution of a methyl methacrylate/isobornyl methacrylate/methacrylic acid (=20/72/8 [mass ratio]) copolymer.

The weight average molecular weight (Mw) of the obtained copolymer was 60,000, and the acid value thereof was 54.2 mg KOH/g. The weight average molecular weight was measured by Gel Permeation Chromatography (GPC) and expressed in terms of polystyrene. GPC was performed using HLC-8020GPC (trade name, manufactured by Tosoh Corporation), TSKGEL SUPER HZM-H, TSKGEL SUPER HZ4000, AND TSKGEL SUPER HZ200 (all trade names, manufactured by Tosoh Corporation) as columns, and tetrahydrofuran (THF) as a eluate. The acid value was measured by the method described in JIS standards (JIS K0070: 1992).

Subsequently, 588.2 g of the resin solution was weighed, and 165 g of isopropanol and 120.8 ml of a 1 mol/L aqueous sodium hydroxide solution were added thereto, and the internal temperature of the reaction container was increased to 80° C. Thereafter, 718 g of distilled water was added dropwise thereto at a rate of 20 ml/min to make an aqueous dispersion. Then the internal temperature of the reaction container was kept at 80° C. for 2 hours, 85° C. for 2 horns, and 90° C. for 2 hours under an atmospheric pressure to evaporate the solvent. In addition, the internal pressure of the reaction container was reduced, and isopropanol, methyl ethyl ketone, and distilled water were evaporated, thereby obtaining an aqueous dispersion of self-dispersing polymer (resin particles) containing a solid content in an amount of 25.0% by mass.

—Preparation of Ink—

By using the resin-coated pigment dispersions and the self-dispersing polymer prepared as above, the inks having the compositions shown in the following Table 1 were prepared. Thereafter, the inks were filtered through a 0.2 μm-membrane filter, thereby obtaining inks A to U. In Table 1, all of the content of the respective components represents the amount [% by mass] based on the total mass of the ink, and the component marked with "*" was added such that the amount thereof became the value in the following Table 1 in terms of the solid content.

All of the obtained ink was prepared such that pH thereof became 8.5. Herein, pH adjustment was performed using 47% by mass sulfuric acid or 50% by mass sodium hydroxide. Moreover, pH was measured using the respective prepared ink in the original state at 25° C.±1° C. by means of a pH meter WM-50EG (trade name, manufactured by DKK-TOA CORPORATION).

TABLE 1

| Composition of Ink | | A | B | C | D | E | F | G | H |
|---|---|---|---|---|---|---|---|---|---|
| Pigment | Resin-coated cyan pigment dispersion A (dispersed with water-insoluble polymer) | 2.5* | 2.5* | 2.5* | 2.5* | 2.5* | 2.5* | 2.5* | 2.5* |
| | Cab-O-Jet 250 (self-dispersing pigment) | | | | | | | | |
| | Resin-coated magenta pigment dispersion B (dispersed with water-insoluble polymer) | | | | | | | | |
| | Resin-coated yellow pigment dispersion C (dispersed with water-insoluble polymer) | | | | | | | | |
| SUNNIX GP250 (manufactured by Sanyo Chemical Industries, Ltd.) | | 10 | 10 | 10 | 10 | 10 | 10 | 10 | 10 |
| Triethylene glycol monomethyl ether | | 3 | 3 | 3 | 3 | 3 | 3 | 3 | 3 |
| Dipropylene glycol | | 5 | 5 | 5 | 5 | 5 | 5 | 5 | 5 |
| PVP, PVA, or PEG | PVP K12 (PVP, Mw = 3,500) | | | | | | 0.05 | | |
| | PVP K15 (PVP, Mw = 8,000 to 10,000) | 0.05 | 0.1 | 0.2 | 0.05 | | | | |
| | PVP K30 (PVP, Mw = 40,000) | | | | | | | 0.05 | |
| | PVP K40 (PVP, Mw = 400,000) | | | | | | | | 0.05 |
| | PEG 20000 (PEG, Mw = 20,000) | | | | | | | | |
| | PVA-205 (PVA, Mw = 20,000) | | | | | | | | |
| Urea | | 5 | 5 | 5 | 5 | 5 | 5 | 5 | 5 |
| OLFINE E1010 | | 1 | 1 | 1 | 1 | 1 | 1 | 1 | 1 |
| Aqueous dispersion of self-dispersing polymer (water-insoluble polymer) | | 8* | 8* | 8* | 8* | 8* | 8* | 8* | 8* |
| Carnauba wax | | 2 | 2 | 2 | 2 | 2 | 2 | 2 | 2 |
| Paraffin wax | | | | | | | | | |
| PROXEL XL2 | | 0.3 | 0.3 | 0.3 | 0.3 | 0.3 | 0.3 | 0.3 | 0.3 |
| Deionized water | | Remnant | Remnant | Remnant | Remnant | Remnant | Remnant | Remnant | Remnant |
| Note | | The invention | The invention | The invention | The invention | The invention | The invention | The invention | The invention |

| Composition of Ink | | I | J | K | L | M | N | O |
|---|---|---|---|---|---|---|---|---|
| Pigment | Resin-coated cyan pigment dispersion A (dispersed with water-insoluble polymer) | 2.5* | 2.5* | 2.5* | | 2.5* | 2.5* | 2.5* |
| | Cab-O-Jet 250 (self-dispersing pigment) | | | | 2.5* | | | |
| | Resin-coated magenta pigment dispersion B (dispersed with water-insoluble polymer) | | | | | | | |
| | Resin-coated yellow pigment dispersion C (dispersed with water-insoluble polymer) | | | | | | | |
| SUNNIX GP250 (manufactured by Sanyo Chemical Industries, Ltd.) | | 10 | 10 | 10 | 10 | 10 | 10 | 10 |
| Triethylene glycol monomethyl ether | | 3 | 3 | 3 | 3 | 3 | 3 | 3 |
| Dipropylene glycol | | 5 | 5 | 5 | 5 | 5 | 5 | 5 |
| PVP, PVA, or PEG | PVP K12 (PVP, Mw = 3,500) | | | | | | | — |
| | PVP K15 (PVP, Mw = 8,000 to 10,000) | | | 0.05 | 0.05 | 1 | | |
| | PVP K30 (PVP, Mw = 40,000) | | | | | | | |
| | PVP K40 (PVP, Mw = 400,000) | | | | | | | |
| | PEG 20000 (PEG, Mw = 20,000) | 0.5 | | | | | 1 | |
| | PVA-205 (PVA, Mw = 20,000) | | 0.05 | | | | | |
| Urea | | 5 | 5 | 5 | 5 | 5 | 5 | 5 |
| OLFINE E1010 | | 1 | 1 | 1 | 1 | 1 | 1 | 1 |
| Aqueous dispersion of self-dispersing polymer (water-insoluble polymer) | | 8* | 8* | 8* | 8* | 8* | 8* | 8* |
| Carnauba wax | | 2 | 2 | 2 | | 2 | 2 | 2 |
| Paraffin wax | | | | | 2 | | | |
| PROXEL XL2 | | 0.3 | 0.3 | 0.3 | 0.3 | 0.3 | 0.3 | 0.3 |
| Deionized water | | Remnant | Remnant | Remnant | Remnant | Remnant | Remnant | Remnant |
| Note | | The invention | The invention | The invention | The invention | Comparative | Comparative | Comparative |

| Composition of Ink | | P | Q | R | S | T | U |
|---|---|---|---|---|---|---|---|
| Pigment | Resin-coated cyan pigment dispersion A (dispersed with water-insoluble polymer) | | 2.5* | 2.5* | | 2.5* | 2.5* |

TABLE 1-continued

| | | 1 | 2 | 3 | 4 | 5 | 6 |
|---|---|---|---|---|---|---|---|
| Cab-O-Jet 250 (self-dispersing pigment) | | | | | | | |
| Resin-coated magenta pigment dispersion B (dispersed with water-insoluble polymer) | | 4* | 4* | | | | |
| Resin-coated yellow pigment dispersion C (dispersed with water-insoluble polymer) | | | | 4* | 4* | | |
| SUNNIX GP250 (manufactured by Sanyo Chemical Industries, Ltd.) | | 4* | 10 | 10 | 10 | 10 | 10 |
| Triethylene glycol monomethyl ether | | 3 | 3 | 3 | 3 | 3 | 3 |
| Dipropylene glycol | | 5 | 5 | 5 | 5 | 5 | 5 |
| PVP, PVA, or PEG | PVP K12 (PVP, Mw = 3,500) PVP K15 (PVP, Mw = 8,000 to 10,000) PVP K30 (PVP, Mw = 40,000) PVP K40 (PVP, Mw = 400,000) PEG 20000 (PEG, Mw = 20,000) PVA-205 (PVA, Mw = 20,000) | 0.05 | — | 0.05 | — | — | 0.8 |
| Urea | | 5 | 5 | 5 | 5 | 5 | 5 |
| OLFINE E1010 | | 1 | 1 | 1 | 1 | 1 | 1 |
| Aqueous dispersion of self-dispersing polymer (water-insoluble polymer) | | 7* | 7* | 7* | 7* | 8* | 8* |
| Carnauba wax Paraffin wax | | 2 | 2 | 2 | 2 | — | 2 |
| PROXEL XL2 | | 0.3 | 0.3 | 0.3 | 0.3 | 0.3 | 0.3 |
| Deionized water | | Remnant | Remnant | Remnant | Remnant | Remnant | Remnant |
| Note | | The invention | Comparative | The invention | Comparative | Comparative | The invention |

Unit of numerical value: % by mass

Details of the components in the Table 1 are as follows.

CAB-O-JET® 250: self-dispersing cyan pigment manufactured by Cabot Corporation PVP K12, PVP K15, PVP K30, PVP K40: all trade names, polyvinylpyrrolidone manufactured by Wako Pure Chemical Industries, Ltd.

PEG 20000: trade name, polyvehylene glycol manufactured by Wako Pure Chemical Industries, Ltd.

PVA-205: trade name, polyvinyl alcohol manufactured by Kuraray Co., Ltd.

OLFINE E1010: trade name, nonionic surfactant manufactured by Nissin Chemical Industry Co., Ltd.

Carnauba wax: trade name SELOSOL 524, manufactured by CHUKYO YUSHI CO., LTD.

Paraffin wax: trade name SELOSOL 428, manufactured by CHUKYO YUSHI CO., LTD.

PROXEL XL2: trade name, 1,2-benzisothiazolin-3-one (manufactured by AVECIA TECHNOLOGY INC)

<Preparation of Treatment Liquid>

The following components were mixed with each other to prepare a treatment liquid. pH (25° C.±1° C.) of the treatment liquid that was measured by the same method as in the case of the ink was 1.04.

<Composition>

| | |
|---|---|
| Orthophosphoric acid (85% aqueous solution) | 5.0% by mass |
| Malonic acid | 12.0% by mass |
| Diethylene glycol | 4% by mass |
| Triethylene glycol monomethyl ether | 4% by mass |
| Deionized water | remnant |

<Preparation of Maintenance Liquid>

The following components were mixed with each other to prepare a maintenance liquid. At this time, BHT was dissolved in advance in DEGmBE (water-soluble organic solvent), and then water and $NaHCO_3$ was added thereto to prepare the maintenance liquid. The pH (25° C.±1° C.) thereof that was measured by the same method as in the case of the ink was 8.6, which was a value obtained immediately after the liquid was prepared.

<Composition>

| | |
|---|---|
| DEGmBE | 25% by mass |
| BHT (2,6-di-t-butyl-4-methylphenol) | 0.01% by mass |
| $NaHCO_3$ | 0.04% by mass |
| Deionized water | remnant |

<Image Formation and Evaluation>

A device having the same constitution as that of the ink jet recording apparatus described in FIG. 1 of JP-A No. 2010-155928 was prepared as an ink jet recording apparatus, and the apparatus was set to the following condition (the signs indicate the number described in FIG. 1). In addition, the fluid ejector described in FIG. 3 in PCT Japanese Translation Patent Publication No. 2008-544852 was used as a recording head. The fluid ejector includes a non-moist layer having a fluorocarbon chain on the surface (outer surface of holes) of the nozzle plane including jetting holes, and a $SiO_2$ layer on an internal surface of the holes.

<Set Condition>

Ink temperature in sub-tank 102: 35° C.

Mesh size of filter 122: 5 μm

Head unit 51: nozzle diameter 18 μm, 1,200 dpi, a length of 2 cm for one unit

Piezoelectric element 68: lead zirconate titanate (piezo)

Amount of ink flowing in common fluid path 52: from 2 ml/sec to 4 ml/sec

—Image Formation 1—

A recording medium (trade name: N SILVER DIAMOND (basis weight 104.7 g/m²), manufactured by NIPPON PAPER INDUSTRIES CO., LTD, coated paper (matt)) was fixed on a stage that can move linearly in a predetermined direction at 500 mm/sec, and the treatment liquid obtained above was coated onto the medium in a coating amount of about 5 g/m² by a wire bar coater. Immediately after coating, the resultant was dried at 50° C. for 2 seconds. Subsequently, the ink jet recording apparatus was immobilized, and while the recording medium was being moved at a constant speed in a sub-scanning direction, each of the inks A to U obtained above was jetted in a line method under jetting conditions of an ink droplet amount of 2.4 pL and a resolution of 1,200 dpi×1,200 dpi, thereby drawing a solid image. Immediately after being drawn, the image was dried at 50° C. for 3 seconds and passed between a pair of fixing rollers heated to 50° C., and fixing treatment was performed at a nip pressure of 0.20 MPa and a nip width of 4 mm, thereby obtaining evaluation samples.

The fixing rollers are constituted with a heating roll obtained by coating the surface of a cylindrical core bar made of SUS that included a built-in halogen lamp in an inside thereof with a silicone resin, and a counter roller pressed on the heating roller.

—1. Sticking Property of Ink—

By using the inks A to U and a test piece (having a $SiO_2$ layer on the surface) having the same layer structure as that of the internal surface of the fluid ejector of the recording head that was used in the above ink jet recording apparatus, the following evaluation was performed.

Each of the ink was dripped in an amount of 5 μL on the $SiO_2$ layer of the test piece and left stand still for 5 minutes in an environment of 23° C. and 50% RH, and then washed with deionized water. In this manner, the existence of an adherend that remained on the test piece was visually observed and evaluated according to the following evaluation criteria. The evaluation results are shown in the following Table 2.

<Evaluation Criteria>
4: An adherend on test piece was not observed
3: A trace in the ink-dripped portion was partially observed.
2: A fringe-like adherend was observed in the ink-dripped portion
1: An adherend was observed in the ink-dripped portion.

—2. Continuous Jetting Property—

By using the respective inks A to U, a line image of 75× 24,000 dpi was drawn on one sheet of recording medium (trade name: KASSA PHOTO FINISH PRO, manufactured by FUJIFILM Corporation) by means of the above ink jet recording apparatus without providing the treatment liquid and the image was dried. The image was thus drawn without performing the fixing treatment of passing the image between fixing rollers (this is called a "drawing sample 1"). Subsequently, jetting operation corresponding to operation of drawing 2,000 sheets of images was performed. Thereafter, the line image was drawn again on a new sheet of recording medium that was the same as the recording medium used above (this is called a "drawing sample 2"). Moreover, jetting operation corresponding to the operation of drawing 2,000 sheets of images was performed, and then the line image was drawn again on a new sheet of recording medium that was the same as the recording medium used above (this is called a "drawing sample 3").

For the drawing samples 1 to 3 obtained as above, the median of the lines was measured using a dot analyzer DA-6000 (trade name, manufactured by Oji Scientific Instruments), and a standard deviation σ of deviated degree from each center line was calculated and evaluated according to the following evaluation criteria. The evaluation results are shown in the following Table 2.

<Evaluation Criteria>
5: σ<1 μm
4: 1 μm≤σ<2 μm
3: 2 μm≤σ<4 μm
2: 4 μm≤σ<6 μm
1: σ≥6 μm —3. Recovery after Leaving—

By using the above inks A to U respectively, a pattern image for nozzle checking and a line image of 75×24,000 dpi were respectively drawn on a sheet of a recording medium ("KASSA PHOTO FINISH PRO", described above) respectively by means of the above ink jet recording apparatus without providing the treatment liquid and the images were dried. The pattern image and the line image were thus drawn without performing the fixing treatment of passing the image between fixing rollers (this is called an "initial image sample") Thereafter, the apparatus was left for 24 hours while the nozzle portion of the recording head was being kept in an environment of 25° C. and 50% RH. After the apparatus was left, the same pattern image for nozzle checking as above was drawn again on one new recording medium, and the same line image as above was drawn on another new recording medium (these are called "image sample(s) after leaving"), the two new recording media being the same as the two recording media used as above.

For the image samples after leaving obtained as above, missing of the nozzle in the pattern image for nozzle checking was observed with an optical microscope to determine jetting rate, and whether or not jetting failure was caused was evaluated. Moreover, for the respective line images of the initial image sample and the image sample after leaving, the median of the lines was measured using a dot analyzer DA-6000 (described above), and a standard deviation σ of deviated degree from each center line was calculated, whereby bent jetting was evaluated according to the following evaluation criteria. The evaluation results are shown in the following Table 2.

The jetting rate (%) was calculated from "total number of nozzles that performed jetting on the image sample after leaving/total number of nozzles that performed jetting on the initial image sample×100".

Evaluation criteria for color missing after leaving
5: The Jetting Rate was 100%.
4: The jetting rate was equal to or higher than 99% and less than 100%.
3: The jetting rate was equal to or higher than 98% and less than 99%.
2: The jetting rate was equal to or higher than 95% and less than 98%.
1: The jetting rate was less than 95%.

Evaluation Criteria for Bent Jetting after Leaving
5: σ<2 μm
4: 2 μm≤σ<4 μm
3: 4 μm≤σ 6 μm
2: 6 μm≤σ<8 μm
1: σ≥8 μm —4. Recovery from Maintenance—

By using the above inks A to U respectively, a pattern image for nozzle checking and a line image of 75×24,000 dpi were respectively drawn on a sheet of a recording medium ("KASSA PHOTO FINISH PRO", described above) by means of the above ink jet recording apparatus without providing the treatment liquid and the images were dried. The images were thus drawn without performing the fixing treatment of passing the image between fixing rollers (this is called an "initial image 1"). Thereafter, jetting operation corresponding to the operation of drawing 2,000 sheets of images was performed. After jetting ended, the nozzle portion of the recording head was left for 4 hours in an environment of 40° C. and 50% RH. Subsequently, the maintenance liquid was applied to the nozzle plate surface of the recording head by using a roller, and the nozzle plate surface of the recording head was wiped with a cloth wiper (trade name: TORAYSEE, manufactured by TORAY INDUSTRIES, INC.). After maintenance was performed in this manner, the same pattern image for nozzle checking was drawn again on one new recording medium, and the same line image was drawn on another new recording medium (these are called "image sample(s) after maintenance"), the two new recording media being the same as the two recording media used as above.

For the image samples after maintenance obtained as above, missing of the nozzle in the pattern image for nozzle checking was observed with an optical microscope to determine jetting rate, and whether or not jetting failure was caused was evaluated. Moreover, for the respective line images of the initial image sample and the image sample after maintenance, the median of the lines was measured using a dot analyzer DA-6000 (described above), and a standard deviation σ of deviated degree from each center line was calculated, whereby bent jetting was evaluated according to the following evaluation criteria. The evaluation results are shown in the following Table 2.

The jetting rate (%) was calculated from "total number of nozzles that performed jetting on the image sample after leaving/total number of nozzles that performed jetting on the initial image sample×100".

DIAMOND, described above) to which a load of 300 g was applied and on which an image was not drawn. In this manner, a degree of color transfer to the recording medium to which an image was not drawn and which was used for rubbing was visually observed and evaluated according to the following evaluation criteria. This was a test conducted in consideration of rubbing resistance of the image against rubbing caused between recording media that are stacked on each other immediately after images are continuously drawn. The evaluation criteria are shown in the following Table 2.

<Evaluation Criteria>

3: Color transfer did not markedly occur even after the same portion was rubbed three times.

2: Color transfer could be visually observed when the image was rubbed twice.

1: Color transfer could be observed when the image was rubbed once.

TABLE 2

| Ink | Sticking property of ink | Continuous jetting property | After leaving Color missing | After leaving Bent jetting | After maintenance Color missing | After maintenance Bent jetting | Rubbing resistance (color transfer) | Note |
|---|---|---|---|---|---|---|---|---|
| A | 4 | 5 | 5 | 5 | 5 | 3 | 3 | The invention |
| B | 4 | 5 | 5 | 5 | 5 | 3 | 3 | The invention |
| C | 4 | 5 | 4 | 4 | 4 | 3 | 3 | The invention |
| D | 3 | 4 | 4 | 4 | 4 | 3 | 3 | The invention |
| E | 3 | 4 | 3 | 4 | 4 | 3 | 3 | The invention |
| F | 3 | 4 | 3 | 4 | 3 | 3 | 3 | The invention |
| G | 3 | 4 | 3 | 3 | 3 | 3 | 3 | The invention |
| H | 3 | 4 | 4 | 4 | 4 | 3 | 3 | The invention |
| I | 3 | 4 | 3 | 4 | 4 | 3 | 3 | The invention |
| J | 3 | 4 | 3 | 3 | 3 | 3 | 3 | The invention |
| K | 4 | 5 | 5 | 5 | 5 | 3 | 3 | The invention |
| L | 4 | 5 | 5 | 5 | 5 | 3 | 3 | The invention |
| M | 2 | 2 | 2 | 3 | 2 | 3 | 2 | Comparative |
| N | 2 | 2 | 2 | 2 | 2 | 3 | 2 | Comparative |
| O | 1 | 1 | 1 | 1 | 1 | 3 | 3 | Comparative |
| P | 4 | 5 | 5 | 5 | 5 | 3 | 3 | The invention |
| Q | 1 | 1 | 1 | 1 | 1 | 3 | 3 | Comparative |
| R | 4 | 5 | 5 | 5 | 5 | 3 | 3 | The invention |
| S | 1 | 1 | 1 | 1 | 1 | 3 | 3 | Comparative |
| T | 2 | 3 | 4 | 3 | 4 | 3 | 1 | Comparative |
| U | 3 | 4 | 4 | 3 | 3 | 3 | 3 | The invention |

Evaluation Criteria for Color Missing after Maintenance
5: The jetting rate was 100%.
4: The jetting rate was equal to or higher than 99% and less than 100%.
3: The jetting rate was equal to or higher than 98% and less than 99%.
2: The jetting rate was equal to or higher than 95% and less than 98%.
1: The jetting rate was less than 95%.
Evaluation Criteria for Bent Jetting after Maintenance
5: $\sigma < 2$ μm
4: $2\ \mu m \leq \sigma < 4\ \mu m$
3: $4\ \mu m \leq \sigma < 6\ \mu m$
2: $6\ \mu m \leq \sigma < 8\ \mu m$
1: $\sigma \geq 8\ \mu m$ —5. Color Transfer Caused by Image Rubbing—

In the Image formation 1, 1,000 sheets of solid images were continuously drawn for preparing evaluation samples, and the portion of the solid image of the respective evaluation samples obtained immediately after the drawing of image was rubbed against a recording medium (trade name: N SILVER As shown in Table 2, examples of the invention are excellent in continuous jetting property, jetting property after leaving, and jetting property after maintenance and makes it possible to stably form images, and the formed images are excellent in rubbing resistance. Moreover, from the evaluation results of the sticking property of ink, it was found that the ink is inhibited from being stuck to an inside of the recording head by the precipitation of the ink, and excellent jetting stability can be expected even in a usage mode in which images are formed while jetting of the ink and suspension of the jetting are being repeated over a long period of time.

Disclosure of Japanese Patent Application No. 2011-032562 is incorporated herein by reference in its entirety.

All publications, patents, patent applications, and technical specifications described herein are incorporated herein by reference to the same extent as if individual publication, patent, patent application and technical specification was specifically and individually indicated to be incorporated by reference.

INDUSTRIAL APPLICABILITY

The invention relates to an ink composition and an ink set that are composed to contain polymer components such as a resin particles or a wax particle, and an image forming method that uses the ink composition or the ink set. Jetting failure and bent jetting resulting from sticking of the ink and nozzle blocking that are caused when the ink is jetted again after the suspension of jetting may be suppressed and excellent maintainability may be realized by using the ink composition or the ink set of the invention is used in the ink jet technique. Moreover, image failures such as color missing may be suppressed and high-definition images may be stably formed over a long period of time by using the image forming method of the invention.

What is claimed is:

1. An image forming method, comprising jetting an ink composition from a jetting head to a recording medium by an ink jet method, wherein:
   the jetting head has plural nozzle holes for jetting liquid droplets and a silicon atom-containing film on an internal surface of the nozzle holes; and
   the ink composition comprises:
      a pigment selected from the group consisting of a self-dispersing pigment and a resin-coated pigment in which at least a portion of a surface of a pigment particle is coated with a water-insoluble resin;
      at least one selected from the group consisting of polyvinylpyrrolidone, polyvinyl alcohol and polyethylene glycol, the content of which is from 0.01% by mass to less than 1.00% by mass based on the total mass of the ink composition;
      a resin particle that is insoluble or hardly soluble in water;
      a wax dispersion comprising an emulsifying dispersant and a wax particle that is insoluble or hardly soluble in water, that is different from the resin particle and that is dispersed in the wax dispersion by the emulsifying dispersant; and
      water.

2. The image forming method of claim 1, wherein the resin-coated pigment is a pigment coated with the water-insoluble resin by phase inversion emulsification.

3. The image forming method of claim 1, wherein the resin particle is a self-dispersing resin particle.

4. The image forming method of claim 1, wherein the resin particle has been synthesized in an organic solvent, and prepared as a dispersion that has water as a continuous phase by neutralization of a part or all of anionic groups of the resin particle.

5. The image forming method of claim 1, wherein the wax particle contains at least one selected from the group consisting of paraffin wax, a paraffin wax derivative, carnauba wax, and any mixture thereof.

6. The image forming method of claim 1, wherein the pH of the ink composition is from 7.5 to 10.0 at 25° C.

7. The image forming method of claim 1, wherein the ink composition further comprises at least one selected from the group consisting of urea and a urea derivative.

8. The image forming method of claim 1, wherein the ink jet method is a piezoelectric ink jet method.

9. The image forming method of claim 1, further comprising applying, to the recording medium, a treatment liquid comprising an aggregation component which forms an aggregate when in contact with the ink composition.

10. The image forming method of claim 9, further comprising fixing an image to the recording medium by heating the image, wherein the image is formed by the jetting of the ink composition and the applying of the treatment liquid.

11. The image forming method of claim 1, wherein the resin particle is a self-dispersing particle comprising a water-insoluble polymer containing a hydrophilic structural unit and a structural unit derived from a cyclic aliphatic group-containing monomer.

12. The image forming method of claim 1, wherein the content of the at least one selected from the group consisting of polyvinylpyrrolidone, polyvinyl alcohol and polyethylene glycol is from 0.05% by mass to 0.1% by mass based on the total mass of the ink composition.

13. An image forming method, comprising:
   jetting an ink composition from a jetting head to a recording medium by a piezoelectric ink jet method;
   applying, to the recording medium, a treatment liquid comprising an aggregation component which forms an aggregate when in contact with the ink composition; and
   fixing an image to the recording medium by heating the image, wherein the image is formed by the jetting of the ink composition and the applying of the treatment liquid, wherein:
   the jetting head has plural nozzle holes for jetting liquid droplets and a silicon atom-containing film on an internal surface of the nozzle holes;
   the ink composition comprises:
      a pigment selected from the group consisting of a self-dispersing pigment and a resin-coated pigment in which at least a portion of a surface of a pigment particle is coated with a water-insoluble resin;
      at least one selected from the group consisting of polyvinylpyrrolidone, polyvinyl alcohol and polyethylene glycol, the content of which is from 0.01% by mass to less than 1.00% by mass based on the total mass of the ink composition;
      a resin particle that is insoluble or hardly soluble in water;
      at least one selected from the group consisting of urea and a urea derivative;
      a wax dispersion comprising an emulsifying dispersant and a wax particle that is insoluble or hardly soluble in water, that is different from the resin particle and that is dispersed in the wax dispersion by the emulsifying dispersant; and
      water;
   the resin-coated pigment is a pigment coated with the water-insoluble resin by phase inversion emulsification;
   the resin particle is a self-dispersing resin particle;
   the resin particle has been synthesized in an organic solvent, and prepared as a dispersion that has water as a continuous phase by neutralization of a part or all of anionic groups of the resin particle; and
   the wax particle contains at least one selected from the group consisting of paraffin wax, a paraffin wax derivative, carnauba wax, and any mixture thereof.

* * * * *